(12) United States Patent
Tanaka

(10) Patent No.: US 11,127,986 B2
(45) Date of Patent: Sep. 21, 2021

(54) ELECTRODE SHEET MANUFACTURING APPARATUS

(71) Applicant: TOYOTA JIDOSHA KABUSHIKI KAISHA, Toyota (JP)

(72) Inventor: Yukiko Tanaka, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 161 days.

(21) Appl. No.: 16/676,821

(22) Filed: Nov. 7, 2019

(65) Prior Publication Data

US 2020/0185782 A1 Jun. 11, 2020

(30) Foreign Application Priority Data

Dec. 6, 2018 (JP) .............................. JP2018-228979

(51) Int. Cl.
*H01M 4/04* (2006.01)
*H01M 10/0587* (2010.01)
*H01M 4/70* (2006.01)
*H01M 4/66* (2006.01)

(52) U.S. Cl.
CPC ....... *H01M 10/0587* (2013.01); *H01M 4/661* (2013.01); *H01M 4/667* (2013.01); *H01M 4/70* (2013.01)

(58) Field of Classification Search
CPC .... H01M 10/0587; H01M 4/70; H01M 4/667; H01M 4/661; H01M 4/0435; H01M 4/0409; H01M 4/0404; H01M 4/043; Y02E 60/10; B05D 1/06
See application file for complete search history.

(56) References Cited

U.S. PATENT DOCUMENTS

| 4,060,648 A | * | 11/1977 | Taylor-Brown | .......... B05B 5/14 427/482 |
| 4,697,514 A | * | 10/1987 | George | ................... B41F 9/001 101/153 |
| 4,909,147 A | * | 3/1990 | George | ................... B41F 9/001 101/170 |

(Continued)

FOREIGN PATENT DOCUMENTS

| JP | 2013-077560 A | 4/2013 |
| JP | 2015-201318 A | 11/2015 |

(Continued)

*Primary Examiner* — Michael L Dignan
(74) *Attorney, Agent, or Firm* — Sughrue Mion, PLLC

(57) ABSTRACT

In an electrode sheet manufacturing apparatus, in a state where a potential difference is caused between a gravure roll and a current collector foil conveyed by a back-up roll, a mixed powder is continuously supplied into recessed portions on an outer peripheral surface of the gravure roll such that the mixed powder is moved from the gravure roll to a surface of a current collector foil by an electrostatic force working between the mixed powder supplied into the recessed portions of the gravure roll and the current collector foil. In the gravure roll, a volume of first-end-side recessed portions per unit area in a first-end-side region and a volume of second-end-side recessed portions per unit area in a second-end-side region are made larger than a volume of intermediate recessed portions per unit area in an intermediate region.

4 Claims, 11 Drawing Sheets

(56) References Cited

U.S. PATENT DOCUMENTS

| | | | |
|---|---|---|---|
| 2010/0216000 A1* | 8/2010 | Fujita | H01M 4/13 |
| | | | 429/94 |
| 2014/0342225 A1 | 11/2014 | Isshiki et al. | |
| 2016/0082467 A1* | 3/2016 | Mikami | H01M 4/0409 |
| | | | 429/209 |
| 2018/0159114 A1* | 6/2018 | Tanihara | H01M 10/0525 |

FOREIGN PATENT DOCUMENTS

| | | |
|---|---|---|
| JP | 2016-031783 A | 3/2016 |
| JP | 2016-071956 A | 5/2016 |
| JP | 2016-115567 A | 6/2016 |

\* cited by examiner

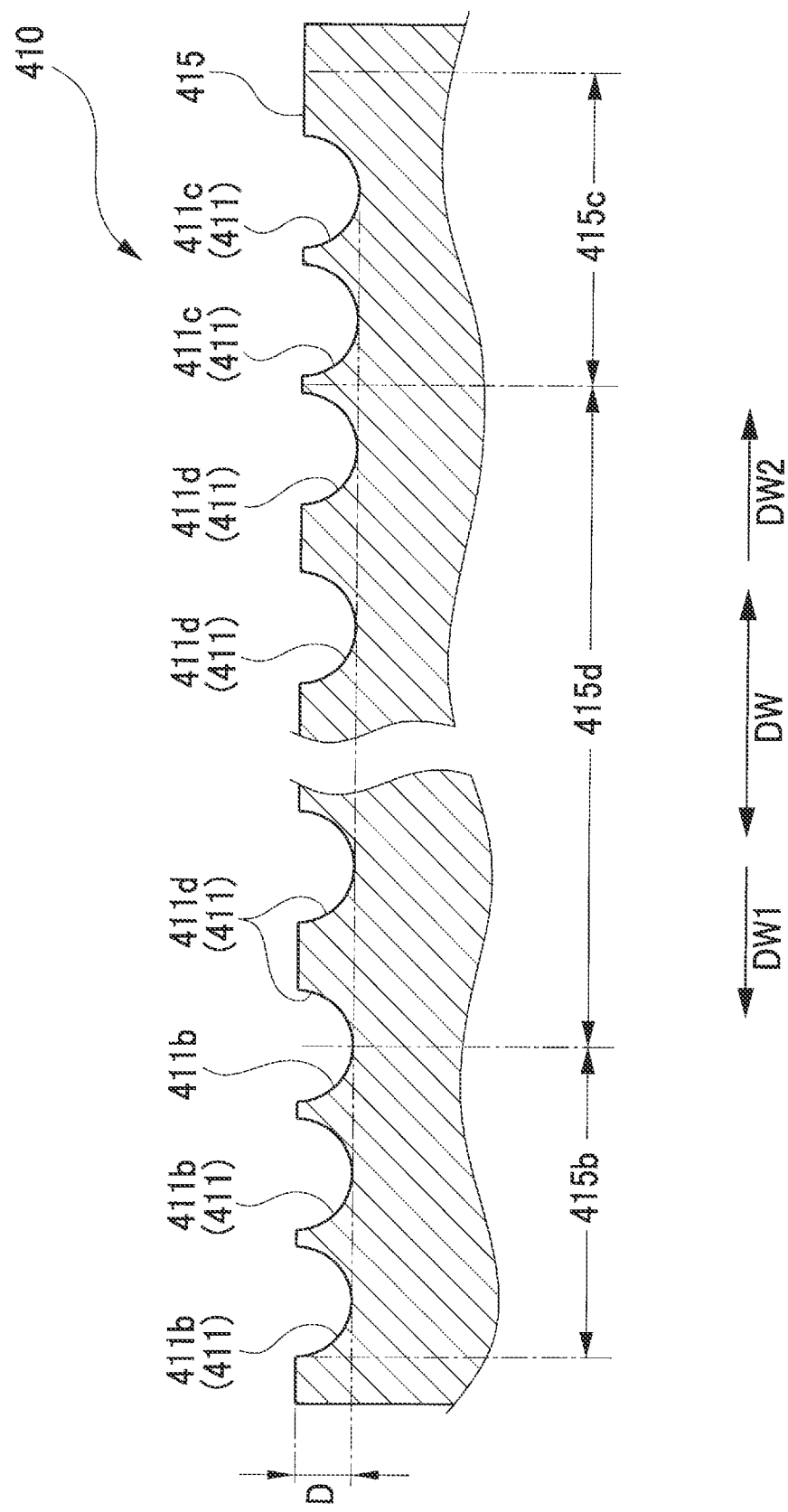

ELECTRODE SHEET MANUFACTURING APPARATUS

INCORPORATION BY REFERENCE

The disclosure of Japanese Patent Application No. 2018-228979 filed on Dec. 6, 2018 including the specification, drawings and abstract is incorporated herein by reference in its entirety.

BACKGROUND

1. Technical Field

The disclosure relates to an apparatus (an electrode sheet manufacturing apparatus) for manufacturing an electrode sheet constituting a cell. More specifically, the disclosure relates to an apparatus for manufacturing an electrode sheet having a structure in which an electrode mixture layer is formed on a surface of a current collector foil.

2. Description of Related Art

In the related art, as an electrode sheet, there has been known an electrode sheet having a structure in which an electrode mixture layer is formed on a surface of a current collector foil. As a manufacturing method for the electrode sheet having such a structure, there have been known methods disclosed in Japanese Unexamined Patent Application Publication No. 2013-77560 (JP 2013-77560 A) and Japanese Unexamined Patent Application Publication No. 2015-201318 (JP 2015-201318 A). More specifically, an electrode mixture made of a plurality of wet granulated bodies formed by mixing and granulating electrode active material particles, a binder, and a solvent is manufactured first. Subsequently, the electrode mixture is passed through a gap between a pair of rolls facing each other, so that the electrode mixture is compressed and formed into a film shape, and the electrode mixture thus formed into a film shape is attached onto a surface of a current collector foil. Thus, a film-shaped electrode-mixture-equipped current collector foil in which the film-shaped electrode mixture is provided on the surface of the current collector foil is manufactured.

More specifically, by passing the electrode mixture through the gap between the rolls constituted by a second roll by which the electrode mixture is transferred to the current collector foil, and a first roll facing the second roll, the electrode mixture is compressed and formed into a film shape, and the electrode mixture thus formed into a film shape is attached to the second roll. After that, the film-shaped electrode mixture attached to the second roll is transferred (attached) to the surface of the current collector foil. After that, the film-shaped electrode mixture attached to the surface of the current collector foil is dried, so that an electrode mixture layer is formed on the surface of the current collector foil.

SUMMARY

In the meantime, in the above manufacturing method, since the electrode mixture made of the wet granulated bodies formed by mixing and granulating the electrode active material particles, the binder, and the solvent is used, it is necessary to provide a drying step of drying the electrode mixture to remove the solvent. Because of this, the above manufacturing method requires a longer manufacturing time, thereby increasing cost. Further, the solvent finally becomes unnecessary for the electrode mixture layer of the electrode sheet. On this account, an apparatus that can manufacture an electrode sheet appropriately without using the solvent has been demanded.

The disclosure is accomplished in view of such a current situation, and an object of the disclosure is to provide an electrode sheet manufacturing apparatus that can form an electrode mixture layer on a surface of a current collector foil appropriately without using a solvent.

One aspect of the disclosure relates to an electrode sheet manufacturing apparatus for manufacturing an electrode sheet in which an electrode mixture layer including an electrode active material and a binder is formed on a surface of a current collector foil. The electrode sheet manufacturing apparatus includes: a gravure roll with an outer peripheral surface having an irregular shape, the gravure roll being configured to rotate; and a back-up roll configured to rotate in a state where the back-up roll faces the gravure roll with a gap being formed between the back-up roll and the gravure roll, the back-up roll being configured to convey the current collector foil by passing the current collector foil through the gap. In a state where a potential difference is caused between the gravure roll and the current collector foil conveyed by the back-up roll, a mixed powder obtained by mixing powder of the electrode active material with powder of the binder without a solvent is continuously supplied into recessed portions on the outer peripheral surface of the gravure roll such that a potential difference is caused between the mixed powder supplied into the recessed portions of the gravure roll and the current collector foil. The mixed powder is moved from the gravure roll to the surface of the current collector foil by an electrostatic force working between the mixed powder and the current collector foil such that the mixed powder is continuously placed on the surface of the current collector foil conveyed by the back-up roll. A region where the recessed portions are provided in a width direction of the gravure roll on the outer peripheral surfaces of the gravure roll includes: a first-end-side region placed on a first end side in the width direction of the gravure roll; a second-end-side region placed on a second end side in the width direction of the gravure roll; and an intermediate region placed between the first-end-side region and the second-end-side region. The recessed portions formed in the gravure roll include: first-end-side recessed portions placed in the first-end-side region; second-end-side recessed portions placed in the second-end-side region; and intermediate recessed portions placed in the intermediate region. A volume of the first-end-side recessed portions per unit area in the first-end-side region and a volume of the second-end-side recessed portions per unit area in the second-end-side region are made larger than a volume of the intermediate recessed portions per unit area in the intermediate region.

The electrode sheet manufacturing apparatus is an electrode sheet manufacturing apparatus for manufacturing an electrode sheet in which an electrode mixture layer including an electrode active material and a binder is formed on a surface of a current collector foil. The electrode sheet manufacturing apparatus includes the gravure roll and the back-up roll configured to rotate in a state where they face each other via a gap. The gravure roll is a roll in which an outer peripheral surface has an irregular shape. Further, the back-up roll is a roll configured to rotate in a state where the buck-up roll faces the gravure roll with a gap being provided between the back-up roll and the gravure roll. The back-up roll is configured to convey the current collector foil by passing the current collector foil through the gap between the back-up roll and the gravure roll.

Further, the electrode sheet manufacturing apparatus is configured such that, in a state where a potential difference is caused between the gravure roll and the current collector foil conveyed by the back-up roll, the mixed powder obtained by mixing the powder of the electrode active material with the powder of the binder without a solvent is continuously supplied into the recessed portions on the outer peripheral surface of the gravure roll so as to cause a potential difference between the mixed powder supplied into the recessed portions of the gravure roll and the current collector foil thus conveyed, and the mixed powder is moved (flown) from the gravure roll to the surface of the current collector foil by an electrostatic force working between the mixed powder and the current collector foil, so that the mixed powder is continuously placed on the surface of the current collector foil conveyed by the back-up roll. Accordingly, with the above manufacturing apparatus, it is possible to form the electrode mixture layer including the electrode active material and the binder on the surface of the current collector foil without using a solvent.

In the meantime, in a case where an electrode sheet is manufactured by use of the electrode sheet manufacturing apparatus, sag parts are formed in the opposite ends of the electrode mixture layer formed on the surface of the current collector foil, in its width direction (a direction perpendicular to the lengthwise direction, a direction corresponding to the width direction of the gravure roll). Herein, the sag parts are parts configured such that the thickness of the electrode mixture layer decreases as it goes toward the ends of the electrode mixture layer in the width direction and are parts placed in the opposite ends of the electrode mixture layer. The sag parts are formed such that, when the electrode mixture layer is formed on the surface of the current collector foil, the electrode active material and the binder as component of the electrode mixture layer expand toward the opposite end sides of the current collector foil (toward the outer side in the width direction). When the width dimensions of the sag parts placed in the opposite ends of the electrode mixture layer in the width direction increase, coating weights of the electrode mixture layer in the opposite ends of the electrode mixture layer in the width direction largely decrease, so that a cell characteristic might decrease. On this account, an electrode sheet manufacturing apparatus that can decrease the width dimensions of the sag parts placed in the opposite ends of the electrode mixture layer in the width direction has been demanded.

Note that, in a case where the electrode sheet is manufactured by use of the electrode sheet manufacturing apparatus, it is considered that the sag parts in the opposite ends of the electrode mixture layer in the width direction are formed in the following manner, for example. More specifically, after the mixed powder is moved (flown) from the gravure roll to the surface of the current collector foil and placed on the surface of the current collector foil conveyed by the back-up roll, the mixed powder thus placed on the surface of the current collector foil is heated and compressed by a pair of heated rolls to be formed into an electrode mixture layer, for example. At this time, materials (the electrode active material and the binder) placed in the opposite ends, in the width direction, of the electrode mixture layer move to expand (flow) outwardly in the width direction on the surface of the current collector foil. Thus, it is considered that the sag parts are formed in the opposite ends of the electrode mixture layer in the width direction such that the thickness of the electrode mixture layer decreases as it goes toward the ends of the electrode mixture layer in the width direction.

Further, there may be such a case that, when the mixed powder placed on the surface of the current collector foil is leveled by a nip roll or the like, for example, to be formed into a mixed powder layer before the mixed powder placed on the surface of the current collector foil is heated and compressed by the heated rolls to be formed into the electrode mixture layer, the mixed powders placed in the opposite ends, in the width direction, of the mixed powder layer move to expand outwardly (toward the opposite end sides) in the width direction on the surface of the current collector foil, so that the thickness of the mixed powder layer decreases as it goes toward the ends of the mixed powder layer in the width direction (that is, the opposite ends of the mixed powder layer in the width direction become sag parts). After that, when the mixed powder placed on the surface of the current collector foil is heated and compressed by the heated rolls so that the mixed powder layer is formed into the electrode mixture layer, materials (the electrode active material and the binder) placed in the opposite ends, in the width direction, of the electrode mixture layer (the mixed powder layer) move to expand further outwardly (toward the opposite end sides) in the width direction on the surface of the current collector foil, so that it is considered that the sag parts are formed such that the thickness of the electrode mixture layer decreases as it goes toward the ends of the electrode mixture layer in the width direction.

On the other hand, in the electrode sheet manufacturing apparatus of the above aspect, the gravure roll is configured such that the volume of the first-end-side recessed portions per unit area in the first-end-side region and the volume of the second-end-side recessed portions per unit area in the second-end-side region are made larger than the volume of the intermediate recessed portions per unit area in the intermediate region. Here, the first-end-side region is a part of the outer peripheral surface of the gravure roll and is a part placed on the first end side in the width direction (a direction corresponding to the width direction of the current collector foil) of the gravure roll in a region (a part of or all of the outer peripheral surface) where the recessed portions are provided in the width direction (a direction corresponding to the axis direction) of the gravure roll. Further, the second-end-side region is a part of the outer peripheral surface of the gravure roll and is a part placed on the second end side in the width direction of the gravure roll in the region where the recessed portions are provided in the width direction of the gravure roll. Further, the intermediate region is a part of the outer peripheral surface of the gravure roll and a part placed between the first-end-side region and the second-end-side region in the width direction of the gravure roll (a part adjacent to the first-end-side region and the second-end-side region) in the region where the recessed portions are provided in the width direction of the gravure roll. That is, the region where the recessed portions are provided in the width direction on the outer peripheral surface of the gravure roll is constituted by the first-end-side region, the second-end-side region, and the intermediate region.

Note that a first end of the first-end-side region on the outer peripheral surface of the gravure roll corresponds to a first end of an endmost recessed portion on the first end side in the gravure roll. Accordingly, in a case where a part of the outer peripheral surface of the gravure roll is provided on a side closer to the first end side than the first end of the endmost recessed portion on the first end side in the gravure roll, this part does not correspond to the region where the recessed portions are provided in the width direction, so that the part is not included in the first-end-side region.

Similarly to this, a second end of the second-end-side region on the outer peripheral surface of the gravure roll corresponds to a second end of an endmost recessed portion on the second end side in the gravure roll. Accordingly, in a case where a part of the outer peripheral surface of the gravure roll is provided on a side closer to the second end side than the second end of the endmost recessed portion on the second end side in the gravure roll, this part does not correspond to the region where the recessed portions are provided in the width direction, so that the part is not included in the second-end-side region.

Further, the first-end-side recessed portions indicate recessed portions placed in the first-end-side region among the recessed portions of the gravure roll. Further, the second-end-side recessed portions indicate recessed portions placed in the second-end-side region among the recessed portions of the gravure roll. Further, the intermediate recessed portions indicate recessed portions placed in the intermediate region among the recessed portions of the gravure roll. That is, the recessed portions of the gravure roll are constituted by the first-end-side recessed portions, the second-end-side recessed portions, and the intermediate recessed portions.

As described above, in terms of the gravure roll, the volume of the first-end-side recessed portions per unit area in the first-end-side region and the volume of the second-end-side recessed portions per unit area in the second-end-side region are made larger than the volume of the intermediate recessed portions per unit area in the intermediate region. Accordingly, in terms of the mixed powder filled into the recessed portions of the gravure roll, an amount of the mixed powder per unit area in the first-end-side region and an amount of the mixed powder per unit area in the second-end-side region can be made larger than an amount of the mixed powder per unit area in the intermediate region. Hereby, in terms of the mixed powder to be placed on the surface of the current collector foil by moving (flying) from the gravure roll to the surface of the current collector foil, coating weights (mg/cm$^2$) of the mixed powders to be placed in parts on the opposite end sides (the first end side and the second end side) on the surface of the current collector foil in the width direction can be made larger than a coating weight (mg/cm$^2$) of the mixed powder to be placed in the intermediate part (a part between the part on the first end side and the part on the second end side) in the width direction.

Accordingly, in a case where the mixed powders placed in the parts on the opposite end sides in the width direction on the surface of the current collector foil expand toward the opposite end sides (the outer sides in the width direction), in the width direction, of the current collector foil at the time when the electrode mixture layer is formed on the surface of the current collector foil, the sag parts (parts in which the thickness of the electrode mixture layer decreases as it goes toward the ends in the width direction) can be hardly formed. The reason is as follows. That is, when the mixed powders placed on the opposite end sides in the width direction expand outwardly in the width direction, amounts of the mixed powders per unit area in the current collector foil (that is, the coating weights of the mixed powders) decrease on the opposite end sides in the width direction. However, since "the coating weights (mg/cm$^2$) of the mixed powders placed in the parts on the opposite end sides on the surface of the current collector foil in the width direction are made larger than the coating weight (mg/cm$^2$) of the mixed powder placed in the intermediate part in the width direction," the thicknesses of the mixed powders placed on the opposite end sides in the width direction can hardly decrease in comparison with a "case where the coating weight of the mixed powder is uniform in the width direction (the coating weights of the mixed powders placed on the opposite end sides in the width direction are equal to the coating weight of the mixed powder placed in the intermediate part in the width direction)." This makes it possible to decrease the width dimensions of the sag parts placed in the opposite ends of the electrode mixture layer in the width direction.

Note that the volume of the first-end-side recessed portions per unit area in the first-end-side region is a value (=C1/S1) obtained by dividing a sum (=C1) of volumes of all the first-end-side recessed portions in the first-end-side region by an area of the first-end-side region when it is assumed that no recessed portion is formed in the first-end-side region (an area when it is assumed that the first-end-side region has a flat cylindrical surface, the peripheral length of the first-end-side region×the width dimension=S1). Further, the volume of the second-end-side recessed portions per unit area in the second-end-side region is a value (=C2/S2) obtained by dividing a sum (=C2) of volumes of all the second-end-side recessed portions in the second-end-side region by an area of the second-end-side region when it is assumed that no recessed portion is formed in the second-end-side region (an area when it is assumed that the second-end-side region has a flat cylindrical surface, the peripheral length of the second-end-side region×the width dimension=S2). Further, the volume of the intermediate recessed portions per unit area in the intermediate region is a value (=C3/S3) obtained by dividing a sum (=C3) of volumes of all the intermediate recessed portions in the intermediate region by an area of the intermediate region when it is assumed that no recessed portion is formed in the intermediate region (an area when it is assumed that the intermediate region has a flat cylindrical surface, the peripheral length of the intermediate region×the width dimension=S3).

Further, the form of the recessed portions of the gravure roll may be any form. For example, a plurality of recessed portions having a dimple shape may be placed on the outer peripheral surface of the gravure roll. Alternatively, a plurality of linear recessed portions may be formed on the outer peripheral surface of the gravure roll.

The electrode sheet manufacturing apparatus in the above aspect may further include a pair of heated rolls provided such that the heated rolls face each other via a gap and rotate. The electrode mixture layer including the electrode active material and the binder may be bonded to the surface of the current collector foil by passing the current collector foil on which the mixed powder is placed through the gap between the heated rolls such that the mixed powder is pressed against the current collector foil while the binder included in the mixed powder is softened or melted.

In the electrode sheet manufacturing apparatus of the above aspect, by passing the current collector foil on which the mixed powder is placed through the gap between the heated rolls rotating in a facing manner, the mixed powder is pressed against the current collector foil while the binder included in the mixed powder is softened or melted. Hereby, the mixed powder placed on the surface of the current collector foil is formed into the electrode mixture layer including the electrode active material and the binder, so that the mixed powder is bonded to the surface of the current collector foil via the binder. Thus, the electrode sheet in which the electrode mixture layer including the electrode active material and the binder is bonded to the surface of the current collector foil without a solvent is manufactured. As described above, with the above manufacturing apparatus, the electrode mixture layer can be formed on the surface of the current collector foil as appropriate without using a solvent.

The electrode sheet manufacturing apparatus may further include a nip roll placed on a downstream side from the back-up roll but on an upstream side from the heated rolls in a conveying direction of the current collector foil, the nip roll being configured to level the mixed powder placed on the surface of the current collector foil.

The electrode sheet manufacturing apparatus of the above aspect includes the nip roll placed on the downstream side from the back-up roll but on the upstream side from the heated rolls in the conveying direction of the current collector foil. The nip roll levels the mixed powder placed on the surface of the current collector foil. Accordingly, in the electrode sheet manufacturing apparatus of the above aspect, before the current collector foil on which the mixed powder is placed is passed through the gap between the heated rolls, the mixed powder placed on the surface of the current collector foil can be leveled. Hereby, variations in the thickness of the electrode mixture layer formed on the surface of the current collector foil can be decreased.

Note that, one nip roll should be placed, for example, at a position closer to the outer peripheral surface of the heated roll on the upstream side, in the conveying direction of the current collector foil, from a position where the current collector foil on which the mixed powder is placed is sandwiched between the heated rolls and pressed against the heated rolls, with a gap being provided between the outer peripheral surface of one heated roll (a first heated roll) and the outer peripheral surface of the nip roll (a gap smaller than a sum of the thickness of the current collector foil and the thickness (height) of the mixed powder placed on the surface of the current collector foil). Hereby, when the current collector foil on which the mixed powder is placed is passed through the gap between the nip roll and the first heated roll, the mixed powder placed on the surface of the current collector foil can be leveled.

Further, in any of the electrode sheet manufacturing apparatuses described above, the recessed portions in the gravure roll may have the same depth In the electrode sheet manufacturing apparatus of the above aspect, all the recessed portions formed in the gravure roll have the same depth. Accordingly, in the gravure roll, the depth of the first-end-side recessed portions, the depth of the second-end-side recessed portions, and the depth of the intermediate recessed portions can be equal to each other. Hereby, in the electrode sheet manufacturing apparatus of the above aspect, the gravure roll can be configured such that, while the volume of the first-end-side recessed portions per unit area in the first-end-side region and the volume of the second-end-side recessed portions per unit area in the second-end-side region are made larger than the volume of the intermediate recessed portions per unit area in the intermediate region, the depth of the first-end-side recessed portions, the depth of the second-end-side recessed portions, and the depth of the intermediate recessed portions are equal to each other.

As such, when the depth of the first-end-side recessed portions, the depth of the second-end-side recessed portions, and the depth of the intermediate recessed portions are equal to each other, a distance between the surface of the current collector foil conveyed by the back-up roll and the first-end-side recessed portion (the deepest position), a distance between the surface of the current collector foil conveyed by the back-up roll and the second-end-side recessed portion (the deepest position), and a distance between the surface of the current collector foil conveyed by the back-up roll and the intermediate recessed portion (the deepest position) can be set to the same distance at the position where the outer peripheral surface of the gravure roll faces the outer peripheral surface of the back-up roll (the position where they become closest to each other).

Hereby, an electrostatic force working between the surface of the current collector foil conveyed by the back-up roll and the mixed powder filled in the first-end-side recessed portion, an electrostatic force working between the surface of the current collector foil conveyed by the back-up roll and the mixed powder filled in the second-end-side recessed portion, and an electrostatic force working between the surface of the current collector foil conveyed by the back-up roll and the mixed powder filled in the intermediate recessed portion can be made equal to each other. Accordingly, the mixed powder filled in the first-end-side recessed portion, the mixed powder filled in the second-end-side recessed portion, and the mixed powders filled in the intermediate recessed portion can be moved (flown) to the surface of the current collector foil conveyed by the back-up roll appropriately by the electrostatic force.

In the meantime, as described above, in terms of the gravure roll, the volume of the first-end-side recessed portions per unit area in the first-end-side region and the volume of the second-end-side recessed portions per unit area in the second-end-side region are made larger than the volume of the intermediate recessed portions per unit area in the intermediate region. Accordingly, in terms of the mixed powder to be placed on the surface of the current collector foil by moving (flying) from the gravure roll to the surface of the current collector foil, the coating weights (mg/cm$^2$) of the mixed powders to be placed in the parts on the opposite end sides (the first end side and the second end side) on the surface of the current collector foil in the width direction can be made larger than the coating weight (mg/cm$^2$) of the mixed powder placed in the intermediate part (a part between the part on the first end side and the part on the second end side) in the width direction.

Note that there is such a method that the depth of the first-end-side recessed portions and the depth of the second-end-side recessed portions are made deeper than the depth of the intermediate recessed portions, so that the volume of the first-end-side recessed portions per unit area in the first-end-side region and the volume of the second-end-side recessed portions per unit area in the second-end-side region are made larger than the volume of the intermediate recessed portions per unit area in the intermediate region. However, in this method, at the position where the outer peripheral surface of the gravure roll faces the outer peripheral surface of the back-up roll (the position where they become closest to each other), the distance between the surface of the current collector foil conveyed by the back-up roll and the first-end-side recessed portion (the deepest position) and the distance between the surface of the current collector foil conveyed by the back-up roll and the second-end-side recessed portion (the deepest position) are larger than the distance between the surface of the current collector foil conveyed by the back-up roll and the intermediate recessed portion (the deepest position).

Accordingly, an electrostatic force working between the surface of the current collector foil conveyed by the back-up roll and the mixed powder placed on a bottom side of the first-end-side recessed portion and an electrostatic force working between the surface of the current collector foil conveyed by the back-up roll and the mixed powder placed on a bottom side of the second-end-side recessed portion are smaller than an electrostatic force working between the surface of the current collector foil conveyed by the back-up roll and the mixed powder filled in the intermediate recessed portion. As a result, the mixed powder placed on the bottom side of the first-end-side recessed portion and the mixed powder placed on the bottom side of the second-end-side recessed portion are difficult to move (fly) to the surface of the current collector foil. On this account, in order to appropriately move (fly) the mixed powders to the surface of the current collector foil, it is necessary to cause a larger potential difference between the gravure roll and the current collector foil conveyed by the back-up roll. Accordingly, it is preferable that the depth of the first-end-side recessed portions, the depth of the second-end-side recessed portions, and the depth of the intermediate recessed portions be set to the same depth.

Further, the following aspects are examples as an aspect in which the depth of the first-end-side recessed portions, the depth of the second-end-side recessed portions, and the depth of the intermediate recessed portions are equal to each other and the volume of the first-end-side recessed portions per unit area in the first-end-side region and the volume of the second-end-side recessed portions per unit area in the second-end-side region are larger than the volume of the intermediate recessed portions per unit area in the intermediate region.

(1) An aspect in which the first-end-side recessed portions, the second-end-side recessed portions, and the intermediate recessed portions are formed into the same shape, and the number of first-end-side recessed portions per unit area in the first-end-side region and the number of second-end-side recessed portions per unit area in the second-end-side region are made larger than the number of intermediate recessed portions per unit area in the intermediate region. (2) An aspect in which, in a case where a plurality of recessed portions having a dimple shape is placed on the outer peripheral surface of the gravure roll, diameters (diameters of openings) of the first-end-side recessed portions and the second-end-side recessed portions are made larger than a diameter (a diameter of openings) of the intermediate recessed portions, and those recessed portions are placed at regular intervals on the outer peripheral surface of the gravure roll (for example, the first-end-side recessed portions, the second-end-side recessed portions, and the intermediate recessed portions are placed at regular intervals in the width direction). (3) An aspect in which, in a case where a plurality of recessed portions having a dimple shape is placed on the outer peripheral surface of the gravure roll, diameters (diameters of openings) of the first-end-side recessed portions and the second-end-side recessed portions are made larger than a diameter (a diameter of openings) of the intermediate recessed portions, and a placement distance between the first-end-side recessed portions and a placement distance between the second-end-side recessed portions in the width direction are made smaller than a placement distance between the intermediate recessed portions.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 12 is a sectional view of a gravure roll according to Modification 3.

DETAILED DESCRIPTION OF EMBODIMENTS

Embodiment

Figure 6:
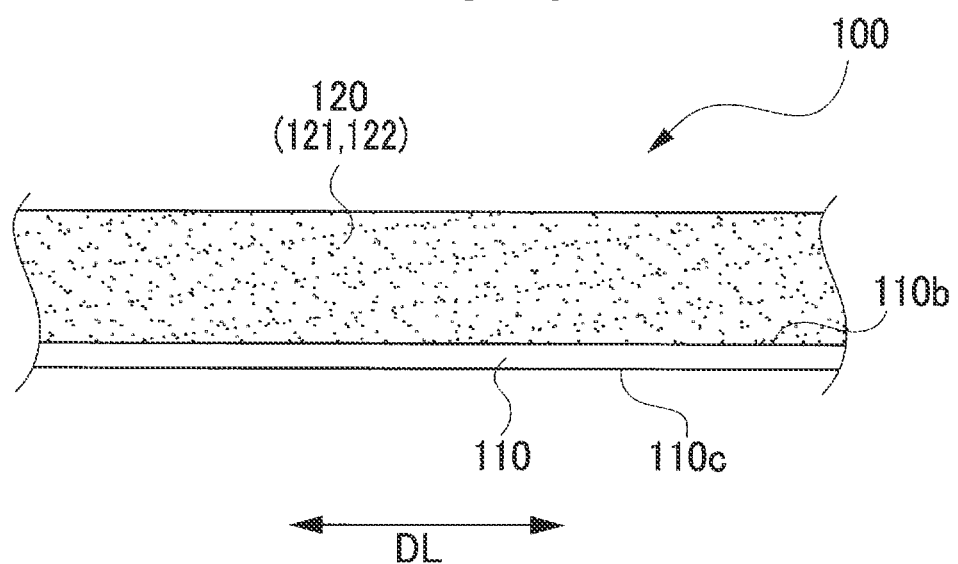
FIG. 6 is an enlarged view of a part G in FIG. 1 and is an enlarged side view of an electrode sheet (a negative electrode sheet) according to the embodiment.

The following describes an embodiment that embodies the disclosure in detail with reference to the drawings. In the present embodiment, the disclosure is applied to manufacture of a negative electrode sheet of a lithium-ion secondary battery. That is, the present embodiment deals with a manufacturing apparatus for a negative electrode sheet as an electrode sheet manufacturing apparatus. In the present embodiment, a negative electrode sheet 100 (an electrode sheet) including a current collector foil 110 and a negative-electrode mixture layer 120 (an electrode mixture layer) formed on a surface (a first surface 110*b*) of the current collector foil 110 is manufactured (see FIG. 6).

Figure 1:
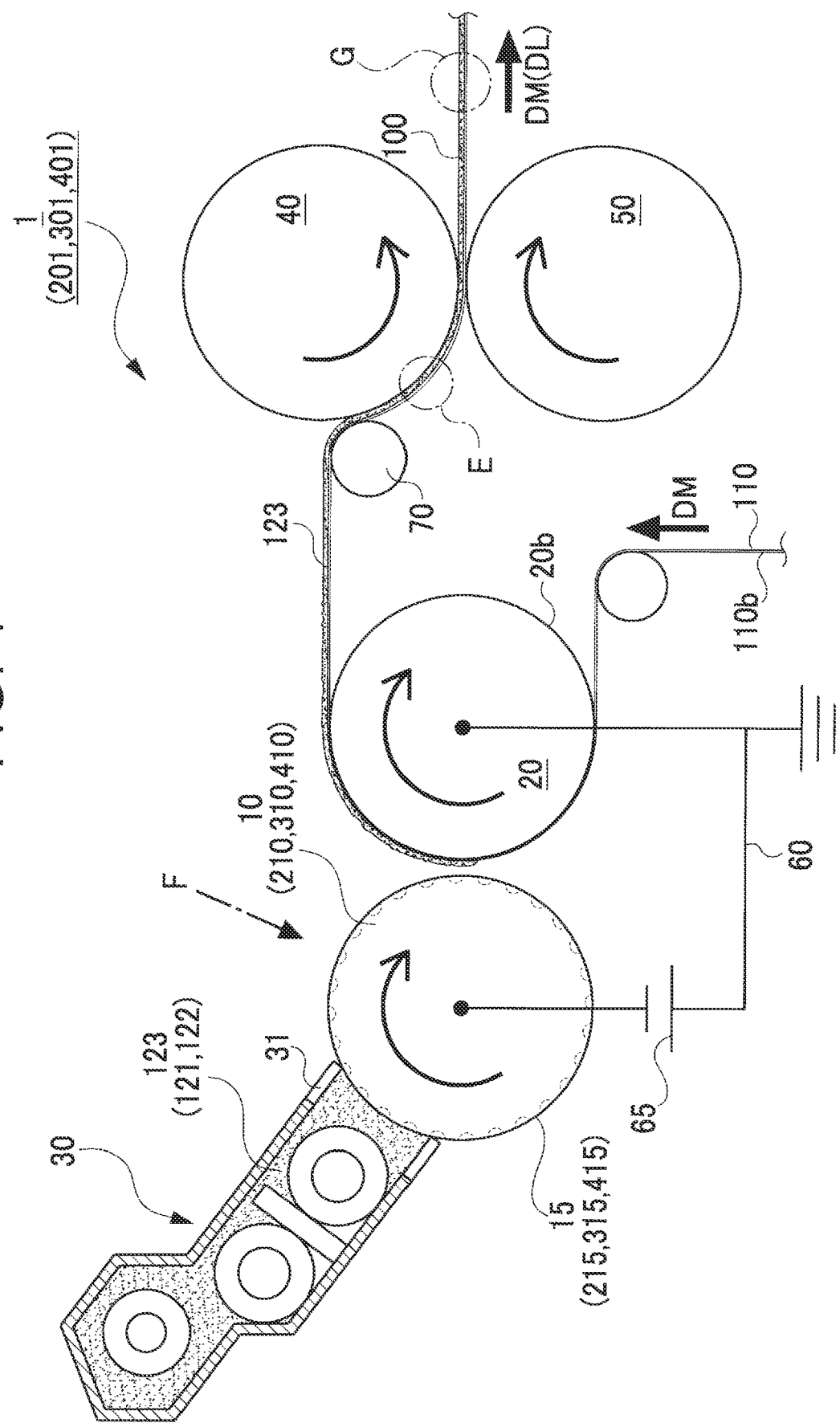
FIG. 1 is a schematic view of an electrode sheet manufacturing apparatus according to an embodiment.

Here, an electrode sheet manufacturing apparatus 1 according to the present embodiment will be described. In the present embodiment, the negative electrode sheet 100 (the electrode sheet) is manufactured by use of the electrode sheet manufacturing apparatus 1. FIG. 1 is a schematic view of a side face of the electrode sheet manufacturing apparatus 1 according to the embodiment. As illustrated in FIG. 1, the electrode sheet manufacturing apparatus 1 includes: a gravure roll 10 and a back-up roll 20 configured to rotate in a facing manner; a mixed powder supply device 30; a first heated roll 40 and a second heated roll 50 (a pair of heated rolls) configured to rotate in a facing manner; and a nip roll 70.

Among them, the gravure roll 10 and the back-up roll 20 are placed to face each other in the horizontal direction (the right-left direction in FIG. 1). Note that the gravure roll 10 and the back-up roll 20 face each other via a slight gap. Further, the gravure roll 10 and the back-up roll 20 rotate around respective central axes (not shown) such that respective rotation directions of these two rolls are the same direction (clockwise in FIG. 1), as indicated by arrows in FIG. 1. In the electrode sheet manufacturing apparatus 1 of the present embodiment, the current collector foil 110 is conveyed in a conveying direction DM by the back-up roll 20 or the like so that the current collector foil 110 is passed through the gap between the gravure roll 10 and the back-up roll 20 (see FIG. 1). Note that the conveying direction DM is the same as a lengthwise direction DL (see FIG. 6) of the current collector foil 110.

More specifically, the current collector foil 110 is provided over an outer peripheral surface 20b of the back-up roll 20. The current collector foil 110 is a metal foil (copper foil) and conveyed from the lower right side of the back-up roll 20 to the top right side thereof along with a rotation of the back-up roll 20 such that the current collector foil 110 passes through the gap at a facing part where the gravure roll 10 and the back-up roll 20 face each other. Note that, in the facing part where the gravure roll 10 and the back-up roll 20 face each other, a gap is further formed between the gravure roll 10 and the current collector foil 110 in a state where the current collector foil 110 passes through the gap at the facing part. That is, the gap between the gravure roll 10 and the back-up roll 20 (the gap in a state where the current collector foil 110 is not passed through the gap) is larger than a thickness of the current collector foil 110.

Figure 2:
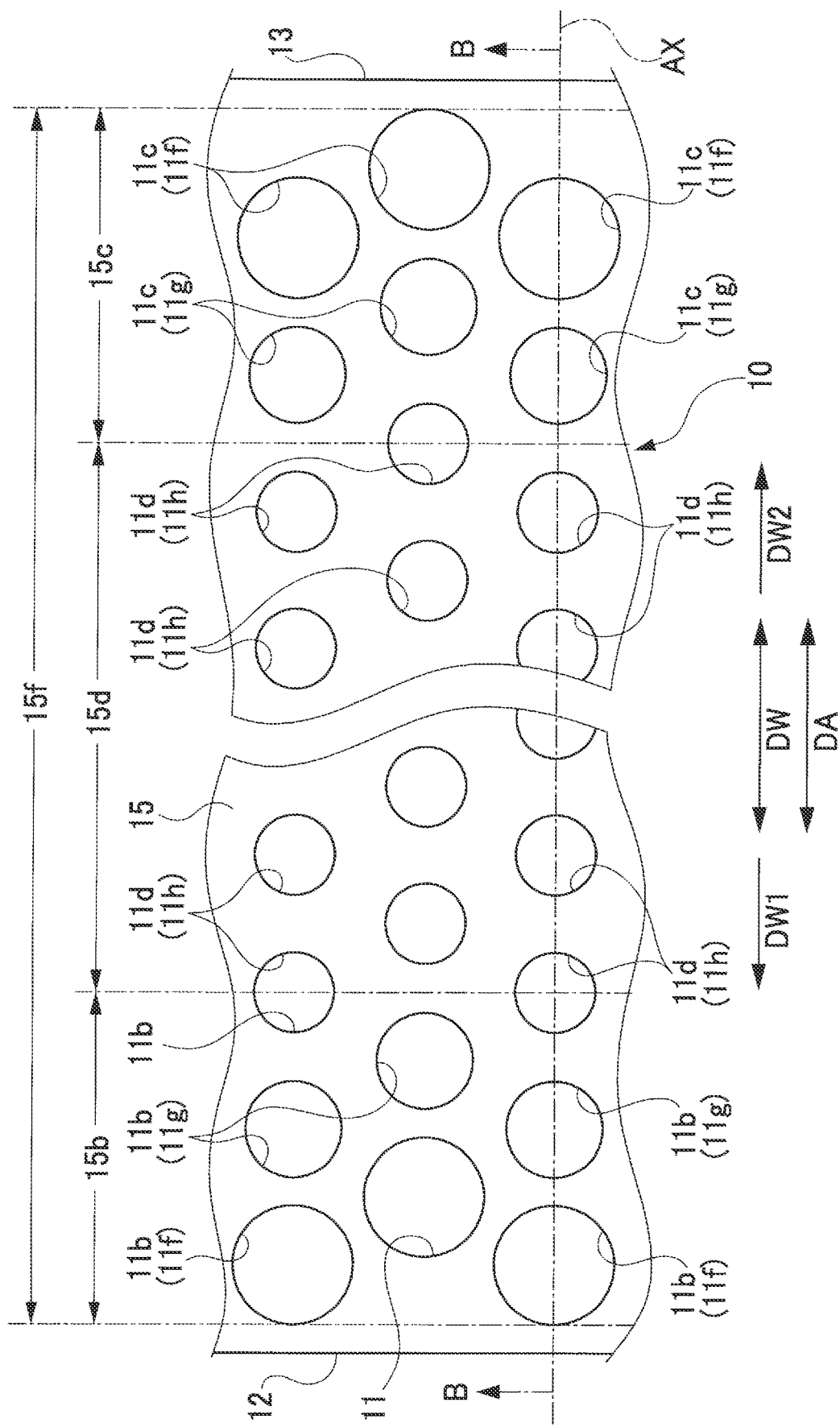
FIG. 2 is an enlarged view of an outer peripheral surface of a gravure roll according to the embodiment.
Figure 3:
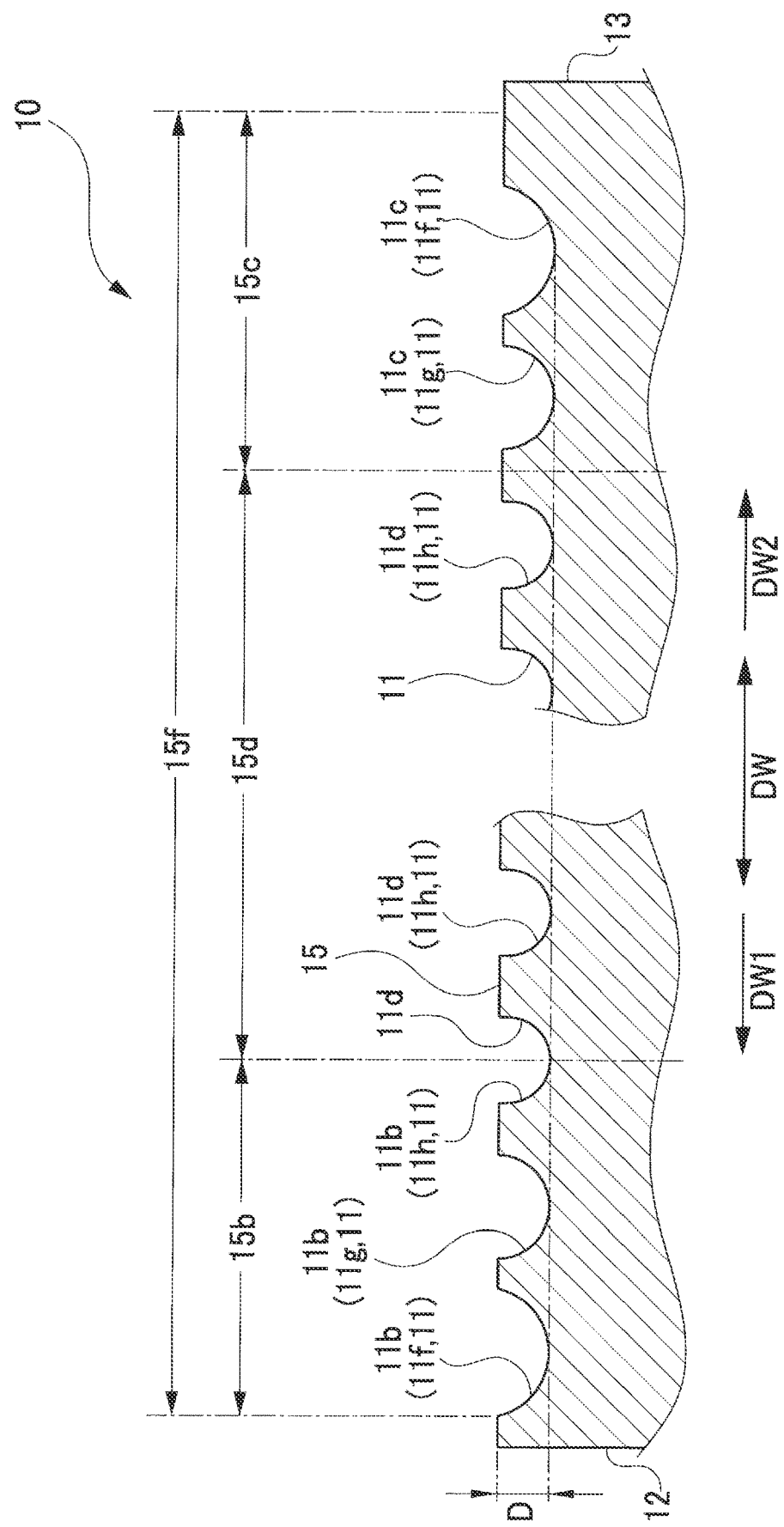
FIG. 3 is a sectional view taken along a line B-B in FIG. 2.

Further, as illustrated in FIGS. 2 and 3, the gravure roll 10 is a gravure roll with an outer peripheral surface 15 having an irregular shape. More specifically, a plurality of recessed portions 11 having a dimple shape is formed on the whole outer peripheral surface 15 of the gravure roll 10. Note that FIG. 2 is a partial enlarged view of the outer peripheral surface 15 of the gravure roll 10. In FIG. 2, AX indicates the central axis of the gravure roll 10. Further, FIG. 3 is a sectional view along a line B-B in FIG. 2 and is an enlarged sectional view of the gravure roll 10 (a sectional view obtained by radially cutting the gravure roll 10 at a position passing through the central axis AX).

Further, the mixed powder supply device 30 is a device configured to continuously supply a mixed powder 123 to the outer peripheral surface 15 of the gravure roll 10. More specifically, the mixed powder supply device 30 continuously supplies the mixed powder 123 into the recessed portions 11 on the outer peripheral surface 15 of the gravure roll 10 so that the recessed portions 11 on the outer peripheral surface 15 of the gravure roll 10 are filled with the mixed powder 123.

Figure 4:
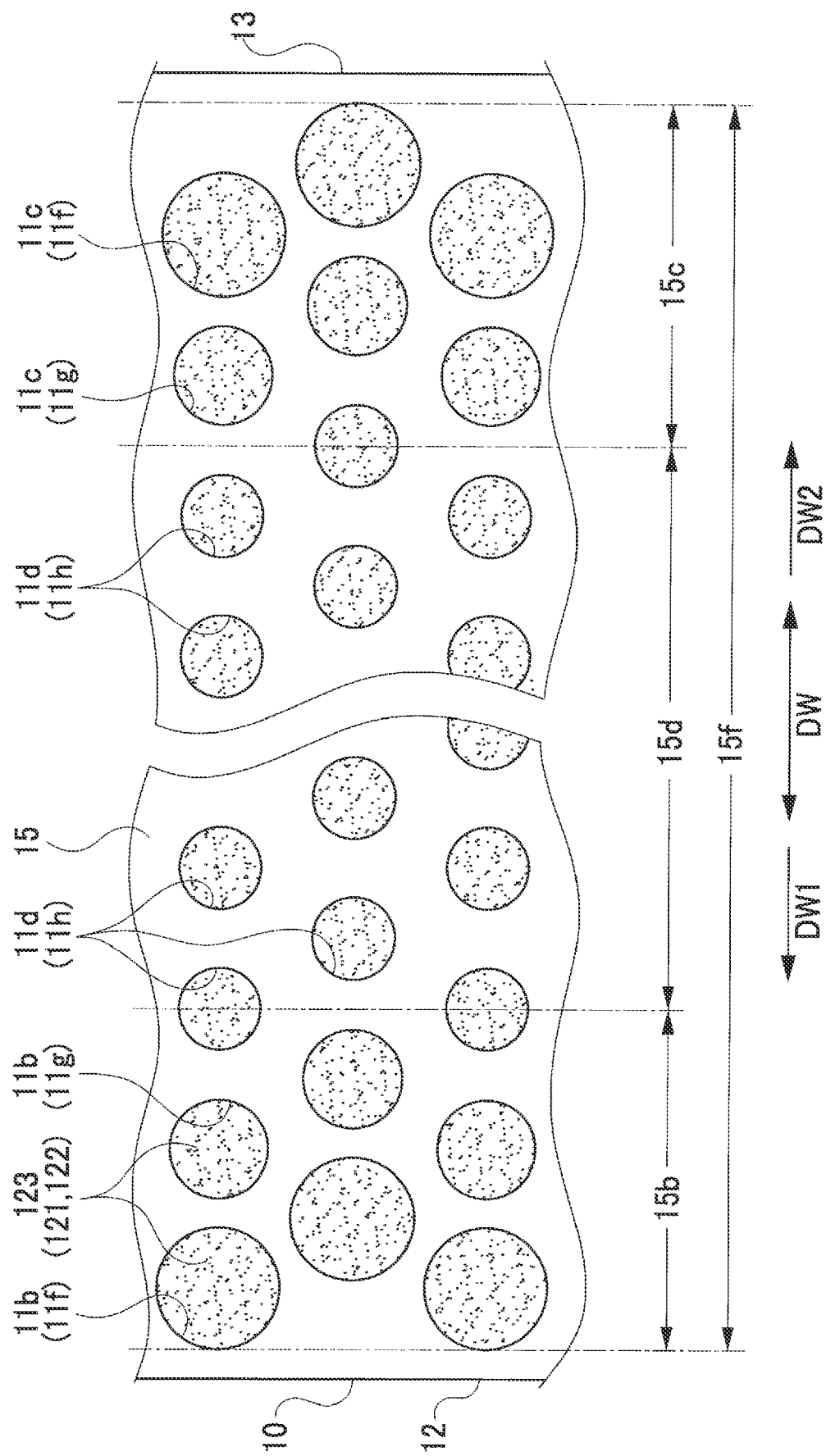
FIG. 4 is an enlarged view from an arrow F in FIG. 1.

Note that a distal end side of the mixed powder supply device 30 is provided with a doctor blade 31. The mixed powder supply device 30 gathers the mixed powder 123 excessively supplied (placed) on the outer peripheral surface 15 of the gravure roll 10 by use of the doctor blade 31 and appropriately fills the mixed powder 123 into the recessed portions 11 on the outer peripheral surface 15 of the gravure roll 10 (see FIG. 4). That is, in the present embodiment, the mixed powder 123 is placed only inside the recessed portions 11 on the outer peripheral surface 15 of the gravure roll 10 (see FIG. 4). Note that FIG. 4 is a partially enlarged view from an arrow F in FIG. 1.

In the present embodiment, the mixed powder 123 in which powder of a negative-electrode active material 121 (an electrode active material) and powder of a binder 122 are mixed with each other without a solvent is used as the mixed powder 123. Note that, in the present embodiment, powder of graphite is used as the powder of the negative-electrode active material 121. Further, powder of PVdF is used as the powder of the binder 122. Further, in the present embodiment, the mixed powder 123 is formed such that the powder of the negative-electrode active material 121 and the powder of the binder 122 are mixed with each other at a weight ratio of 95:5.

In the present embodiment, the powder of the negative-electrode active material 121 and the powder of the binder 122 are mixed with each other by use of a high-speed mixer (made by EARTH TECHNICA CO., LTD.), so as to manufacture the mixed powder 123 made of composite particles (composite particles in a state where particles of the binder 122 are connected to surfaces of particles of the negative-electrode active material 121) obtained such that the particles of the negative-electrode active material 121 are combined with the particles of the binder 122. That is, in the present embodiment, the mixed powder 123 including a plurality of composite particles is used as the mixed powder 123. Note that, in the present embodiment, the mixed powder 123 is manufactured by setting the rotation number of the high-speed mixer to 4000 rpm and the mixing time to one minute.

Further, in the electrode sheet manufacturing apparatus 1 of the present embodiment, a potential difference is caused between the gravure roll 10 and the back-up roll 20 by an electric circuit 60 (see FIG. 1) including a power supply 65. Hereby, a potential difference is caused between the mixed powder 123 placed inside the recessed portions 11 on the outer peripheral surface 15 of the gravure roll 10 and the current collector foil 110 conveyed by making contact with the outer peripheral surface 20b of the back-up roll 20. As a result, an electrostatic force works between the mixed powder 123 and the current collector foil 110. Accordingly, the electric circuit 60 functions as a potential difference generator configured to generate a potential difference between the gravure roll 10 (moreover, the mixed powder 123 placed inside the recessed portions 11) and the back-up roll 20 (moreover, the current collector foil 110 conveyed by the back-up roll 20).

In the meantime, the current collector foil 110 is maintained in a state where a tensile force is applied in the lengthwise direction DL (a direction corresponding to the conveying direction DM) of the current collector foil 110 by the back-up roll 20, the nip roll 70, the first heated roll 40, the second heated roll 50, and so on. In the meantime, the mixed powder 123 is just placed inside the recessed portions 11 on the outer peripheral surface 15 of the gravure roll 10. On this account, due to the electrostatic force working between the mixed powder 123 and the current collector foil 110, the mixed powder 123 moves (flies) to a surface (a first surface 110b) of the current collector foil 110 from the outer peripheral surface 15 of the gravure roll 10.

Accordingly, in the present embodiment, in a state where the potential difference is caused between the gravure roll 10 and the current collector foil 110 conveyed by the back-up roll 20, the mixed powder 123 is continuously supplied into the recessed portions 11 on the outer peripheral surface 15 of the gravure roll 10, so that a potential difference is caused between the mixed powder 123 supplied into the recessed portions 11 of the gravure roll 10 and the current collector foil 110. Hereby, the mixed powder 123 (aggregates of the mixed powder 123 filled in the recessed portions 11) is moved (flown) to the surface (the first surface 110b) of the current collector foil 110 from the outer peripheral surface 15 of the gravure roll 10 by an electrostatic force working between the mixed powder 123 and the current collector foil 110, so that the mixed powder 123 (the aggregates of the mixed powder 123) can be continuously placed on the surface (the first surface 110b) of the current collector foil 110 conveyed by the back-up roll 20.

Further, the nip roll 70 is the nip roll 70 having a heat resistance and is placed to face the first heated roll 40 at a position on the downstream side from the back-up roll 20 in the conveying direction DM of the current collector foil 110 and at a position on the upstream side from the heated rolls (the first heated roll 40 and the second heated roll 50) (at a position on the upstream side from a position where the current collector foil 110 on which the mixed powder 123 is placed is sandwiched between the heated rolls and pressed against the heated rolls) (see FIG. 1). Note that an outer peripheral surface of the nip roll 70 faces an outer peripheral surface of the first heated roll 40 via a slight gap. The current collector foil 110 on which the mixed powder 123 is placed is passed through a gap at a facing part where the outer peripheral surface of the nip roll 70 and the outer peripheral surface of the first heated roll 40 face each other.

Note that a gap dimension at the facing part where the nip roll 70 and the first heated roll 40 face each other is larger than the thickness of the current collector foil 110 but is smaller than a sum of the thickness of the current collector foil 110 and the thickness (a maximum thickness) of the mixed powder 123 placed on the first surface 110b of the current collector foil 110. Hereby, when the current collector foil 110 on which the mixed powder 123 is placed passes through the gap at the facing part where the nip roll 70 and the first heated roll 40 face each other, the mixed powder 123 is leveled on the first surface 110b of the current collector foil 110 so as to become a layer (a mixed powder layer 127) having a uniform thickness.

Figure 5:
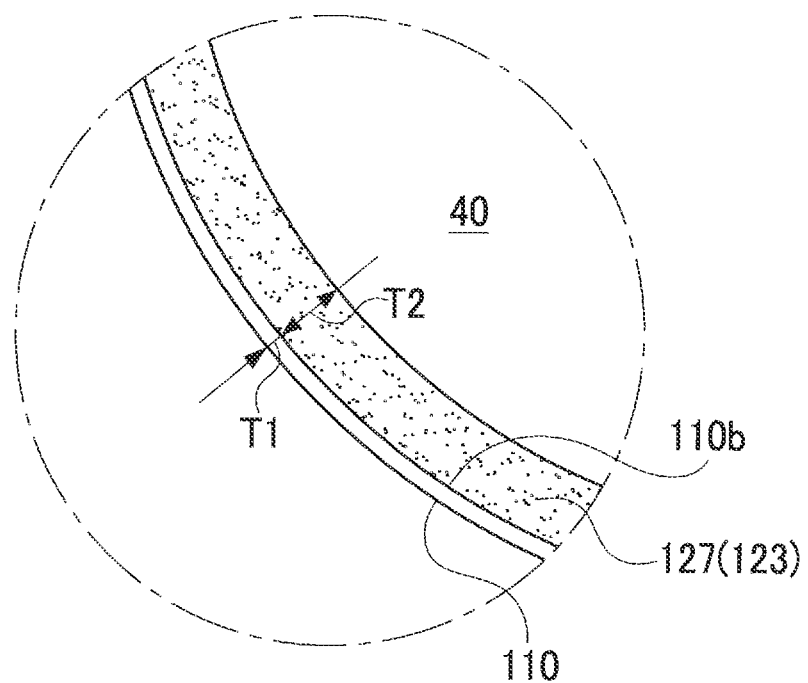
FIG. 5 is an enlarged view of a part E in FIG. 1.

Accordingly, when the current collector foil 110 on which the mixed powder 123 is placed passes through the gap at the facing part where the nip roll 70 and the first heated roll 40 face each other, the mixed powder layer 127 (the mixed powder layer 127 having a generally uniform thickness) made of the mixed powder 123 is formed on the first surface 110b of the current collector foil 110, as illustrated in FIG. 5. Note that FIG. 5 is an enlarged view of a part E in FIG. 1.

The first heated roll 40 and the second heated roll 50 are placed to face each other in the vertical direction (in the up-down direction in FIG. 1) at a position on the downstream side from the nip roll 70 in the conveying direction DM of the current collector foil 110. Note that the first heated roll 40 and the second heated roll 50 face each other via a gap. Further, the first heated roll 40 and the second heated roll 50 are set such that respective rotation directions of these two rolls are reverse to each other, that is, the two rolls facing each other rotate in respective forward directions, as indicated by arrows in FIG. 1.

The current collector foil 110 in which the mixed powder layer 127 made of the mixed powder 123 is placed on the first surface 110b is passed through the gap at the facing part where the first heated roll 40 and the second heated roll 50 face each other. Note that a gap dimension at the facing part where the first heated roll 40 and the second heated roll 50 face each other is smaller than a sum (T1+T2, see FIG. 5) between a thickness T1 of the current collector foil 110 and a thickness T2 of the mixed powder layer 127. Further, temperatures of the outer peripheral surfaces of the first heated roll 40 and the second heated roll 50 are set to a temperature at which the binder 122 included in the mixed powder layer 127 softens or melts.

Accordingly, when the current collector foil 110 on which the mixed powder layer 127 is placed passes through the gap at the facing part where the first heated roll 40 and the second heated roll 50 face each other, the current collector foil 110 is subjected to hot-pressing in the thickness direction. More specifically, when the current collector foil 110 on which the mixed powder layer 127 is placed passes through the gap at the facing part where the first heated roll 40 and the second heated roll 50 face each other, the mixed powder layer 127 is pressed against the current collector foil 110 in the thickness direction (the mixed powder layer 127 is pressurized toward the first surface 110b of the current collector foil 110, so that the mixed powder layer 127 is pressed against the first surface 110b of the current collector foil 110), and the binder 122 included in the mixed powder layer 127 is heated to soften or melt (hereby, the mixed powder layer 127 is formed into the negative-electrode mixture layer 120).

Hereby, particles of the negative-electrode active material 121 included in the mixed powder layer 127 are joined to each other via the binder 122, and the negative-electrode mixture layer 120 made of the negative-electrode active material 121 and the binder 122 is bonded to the surface (the first surface 110b) of the current collector foil 110 via the binder 122. Hereby, a negative electrode sheet 100 (an electrode sheet) in which the negative-electrode mixture layer 120 (the electrode mixture layer) made of the negative-electrode active material 121 (the electrode active material) and the binder 122 is bonded to the surface (the first surface 110b) of the current collector foil 110 is manufactured without using a solvent. As described above, with the electrode sheet manufacturing apparatus 1 of the present embodiment, it is possible to form the negative-electrode mixture layer 120 (the electrode mixture layer) including the negative-electrode active material 121 (the electrode active material) and the binder 122 on the surface (the first surface 110b) of the current collector foil 110 without using a solvent.

Figure 7:
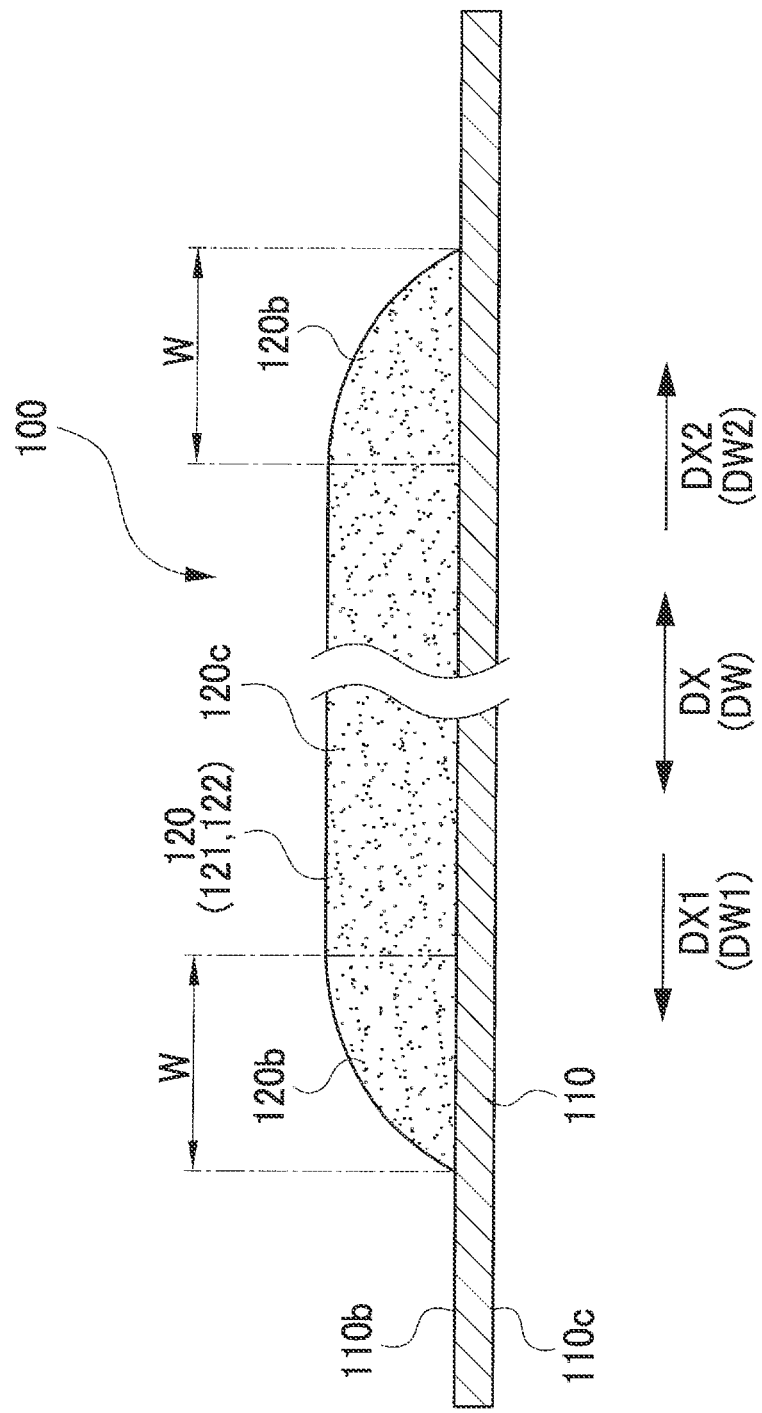
FIG. 7 illustrates sag parts of the electrode sheet (the negative electrode sheet)

In the meantime, in a case where the negative electrode sheet 100 (the electrode sheet) is manufactured by use of the electrode sheet manufacturing apparatus, sag parts 120b are formed in the opposite ends of the negative-electrode mixture layer 120 (the electrode mixture layer) formed on the surface (the first surface 110b) of the current collector foil 110, in a width direction DX (a direction perpendicular to the lengthwise direction DL, a direction corresponding to the width direction DW of the gravure roll 10, the right-left direction in FIG. 7) (see FIG. 7).

The sag parts 120b are parts placed in the opposite ends of the negative-electrode mixture layer 120 (the electrode mixture layer) in the width direction DX and are parts having a thickness thinner than an intermediate part 120c in the width direction DX (a part placed between the opposite ends in the width direction DX). More specifically, the sag parts 120b are parts configured such that the thickness of the negative-electrode mixture layer 120 (the electrode mixture layer) decreases as it goes toward the ends of the negative-electrode mixture layer 120 (the electrode mixture layer) in the width direction DX (see FIG. 7).

At the time of forming the negative-electrode mixture layer 120 (the electrode mixture layer) on the surface (the first surface 110b) of the current collector foil 110, the electrode active material 121 and the binder 122 as components of the negative-electrode mixture layer 120 (the electrode mixture layer) expand (flow) toward the opposite end sides of the current collector foil 110 in the width direction DX (toward the outer side in the width direction DX), so that the sag parts 120b are formed. As width dimensions W of the sag parts 120b placed in the opposite ends of the negative-electrode mixture layer 120 (the electrode mixture layer) in the width direction DX increase, respective coating weights (mg/cm$^2$) of the negative-electrode mixture layer 120 (the electrode mixture layer) in the opposite ends of the negative-electrode mixture layer 120 (the electrode mixture layer) in the width direction DX largely decrease, so that a cell characteristic might decrease. On this account, an electrode sheet manufacturing apparatus that can decrease the width dimensions W of the sag parts 120b placed in the opposite ends of the negative-electrode mixture layer 120 (the electrode mixture layer) in the width direction DX has been demanded.

Figure 8:
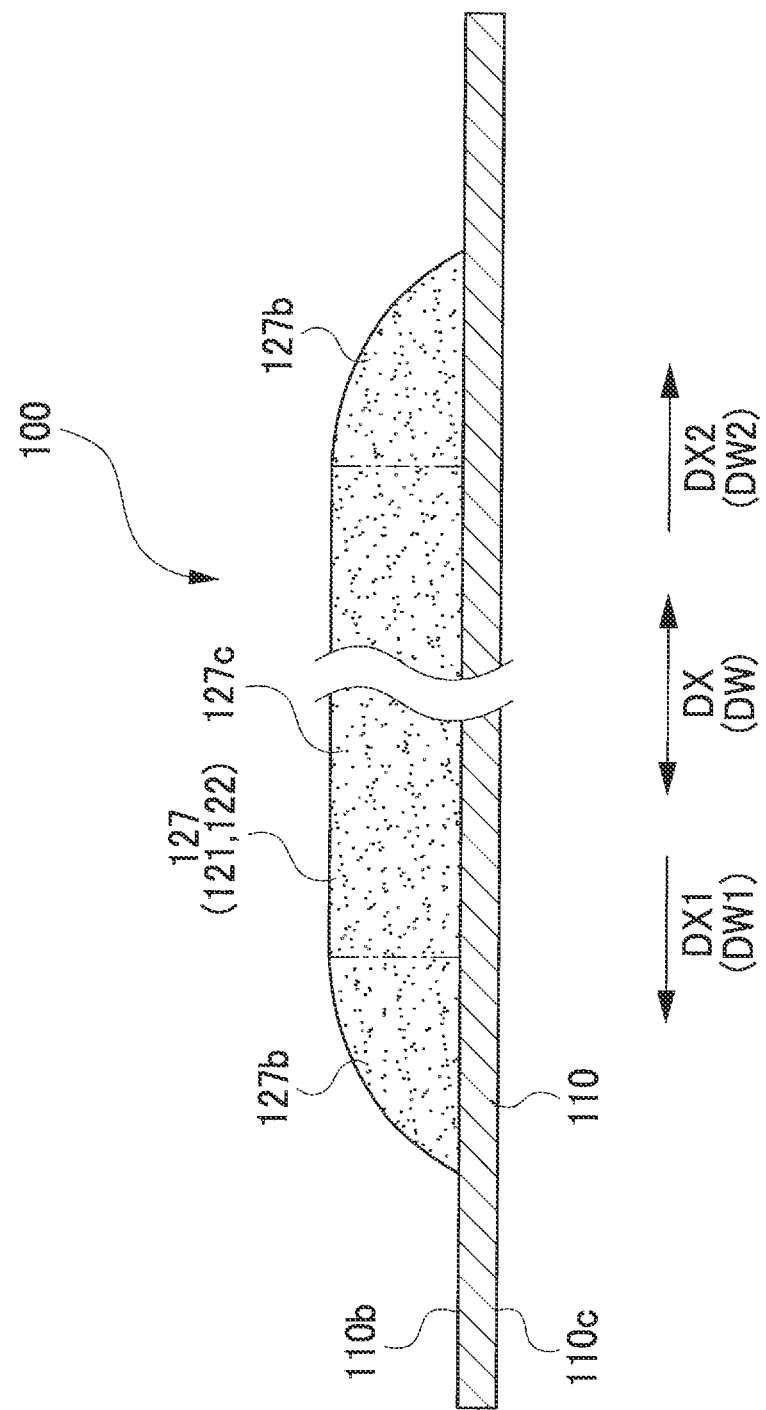
FIG. 8 is a view illustrating sag parts of a mixed powder layer.

Note that, in a case where the negative electrode sheet 100 is manufactured by use of the electrode sheet manufacturing apparatus 1, it is considered that the sag part 120b is formed in the following manner, for example. More specifically, when the current collector foil 110 on which the mixed powder 123 is placed passes through the gap at the facing part where the nip roll 70 and the first heated roll 40 face each other, the mixed powder 123 is leveled on the first surface 110b of the current collector foil 110 so as to be formed into the mixed powder layer 127. At this time, respective mixed powders 123 placed in the opposite ends, in the width direction DX, of the mixed powder layer 127 move to expand outwardly (toward the opposite end sides) in the width direction DX on the first surface 110b of the current collector foil 110, so that the thickness of the mixed powder layer 127 decreases as it goes toward the ends of the mixed powder layer 127 in the width direction DX. That is, the opposite ends (an end on a first end side DX1 and an end on a second end side DX2) of the mixed powder layer 127 in the width direction DX become sag parts 127b (see FIG. 8).

After that, when the mixed powder layer 127 placed on the first surface 110b of the current collector foil 110 is heated and compressed by the heated rolls (the first heated roll 40 and the second heated roll 50) so as to be formed into the negative-electrode mixture layer 120, materials (the negative-electrode active material 121 and the binder 122) placed in the opposite ends of the negative-electrode mixture layer 120 (the mixed powder layer 127) in the width direction DX move to further expand toward the opposite end sides (the first end side DX1 and the second end side DX2) in the width direction DX on the first surface 110b of the current collector foil 110, so that it is considered that the sag parts 120b are formed such that the thickness of the negative-electrode mixture layer 120 decreases as it goes toward the ends of the negative-electrode mixture layer 120 in the width direction DX.

In the meantime, in the electrode sheet manufacturing apparatus 1 of the present embodiment, in terms of the gravure roll 10, a volume of first-end-side recessed portions 11b per unit area in a first-end-side region 15b and a volume of second-end-side recessed portions ilc per unit area in a second-end-side region 15c are made larger than a volume of intermediate recessed portions 11d per unit area in an intermediate region 15d (see FIGS. 2 and 3).

Here, the first-end-side region 15b is a part of the outer peripheral surface 15 of the gravure roll 10 and a part (supply region) placed on a first end side DW1 (a first end 12 side of the gravure roll 10, a left end side in FIG. 2) in the width direction DW of the gravure roll 10 (in a direction corresponding to the width direction DX of the current collector foil 110) in a region where the recessed portions 11 are formed (referred to as a recessed portion presence region 15f) in the width direction DW of the gravure roll 10 (in a direction corresponding to an axis direction DA along the central axis AX of the gravure roll 10). The recessed portion presence region 15f is a part of the outer peripheral surface 15 of the gravure roll 10 and a region except regions in the opposite ends of the outer peripheral surface 15 (see FIGS. 2 and 3).

Further, the second-end-side region 15c is a part of the outer peripheral surface 15 of the gravure roll 10 and a part (region) placed on a second end side DW2 (on a second end 13 side of the gravure roll 10, a right end side in FIG. 2) in the width direction DW of the gravure roll 10 in the recessed portion presence region 15f. Further, the intermediate region 15d is a part of the outer peripheral surface 15 of the gravure roll 10 and a part (region) placed between the first-end-side region 15b and the second-end-side region 15c (a part adjacent to the first-end-side region 15b and the second-end-side region 15c) in the width direction DW of the gravure roll 10 in the recessed portion presence region 15f. That is, the region (the recessed portion presence region 15f) where the recessed portions 11 are formed in the width direction DW on the outer peripheral surface 15 of the gravure roll 10 is constituted by the first-end-side region 15b, the second-end-side region 15c, and the intermediate region 15d.

Note that, a first end (the left end in FIG. 2) of the first-end-side region 15b on the outer peripheral surface 15 of the gravure roll 10 corresponds to a first end of an endmost recessed portion 11 on the first end side DW1 in the gravure roll 10. Accordingly, a part (the left end part in FIG. 2) of the outer peripheral surface 15 of the gravure roll 10, the part being placed on a side further closer to the first end side DW1 than the first end of the endmost recessed portion 11 on the first end side DW1 in the gravure roll 10, does not correspond to the region (the recessed portion presence region 15f) where the recessed portions 11 are formed in the width direction DW, and therefore, the part is not included in the first-end-side region 15b.

Similarly to this, a second end (the right end in FIG. 2) of the second-end-side region 15c of the outer peripheral surface 15 of the gravure roll 10 corresponds to a second end of an endmost recessed portion 11 on the second end side DW2 in the gravure roll 10. Accordingly, a part (the right end part in FIG. 2) of the outer peripheral surface 15 of the gravure roll 10, the part being placed on a side further closer to the second end side than the second end of the endmost recessed portion 11 on the second end side DW2 in the gravure roll 10, does not correspond to the region (the recessed portion presence region 15f) where the recessed portions 11 are formed in the width direction DW, and therefore, the part is not included in the second-end-side region 15c.

Further, the first-end-side recessed portions 11b indicate recessed portions 11 placed in the first-end-side region 15b among the recessed portions 11 of the gravure roll 10 (see FIGS. 2 and 3). The first-end-side recessed portions 11b include recessed portions 11f with a largest volume, recessed portions 11g with a second largest volume, and some of recessed portions 11h with a third largest volume among the recessed portions 11. Further, the second-end-side recessed portions 11c indicate recessed portions 11 placed in the second-end-side region 15c among the recessed portions 11 of the gravure roll 10. Similarly to the first-end-side recessed portions 11b, the second-end-side recessed portions 11c include the recessed portions 11f with the largest volume, the recessed portions 11g with the second largest volume, and some of the recessed portions 11h with the third largest volumes among the recessed portions 11 (see FIGS. 2 and 3).

Further, the intermediate recessed portions 11d indicate recessed portions 11 placed in the intermediate region 15d among the recessed portions 11 of the gravure roll 10. The intermediate recessed portions 11d are constituted by the recessed portions 11h with a smallest volume (the third largest volume) among the recessed portions 11. Accordingly, the recessed portions 11 of the gravure roll 10 are constituted by the first-end-side recessed portions 11b, the second-end-side recessed portions 11c, and the intermediate recessed portions 11d. Note that, in the present embodiment, in terms of openings of the recessed portions 11, the opening of the recessed portion 11f has a largest diameter, the opening of the recessed portion 11g has a second largest diameter, and the opening of the recessed portion 11h has a smallest diameter.

As described above, in terms of the gravure roll 10, the volume of the first-end-side recessed portions 11b per unit area in the first-end-side region 15b and the volume of the second-end-side recessed portions 11c per unit area in the second-end-side region 15c are made larger than the volume of the intermediate recessed portions 11d per unit area in the intermediate region 15d. Accordingly, in terms of the mixed powder 123 filled into the recessed portions 11 of the gravure roll 10, an amount of the mixed powder 123 per unit area in the first-end-side region 15b and an amount of the mixed powder 123 per unit area in the second-end-side region 15c can be made larger than an amount of the mixed powder 123 per unit area in the intermediate region 15d (see FIG. 4).

Note that, in the present embodiment, a distance between the first-end-side recessed portions 11b adjacent to each other in the width direction DW of the gravure roll 10 (a distance between the recessed portion 11f and the recessed portion 11g and a distance between the recessed portion 11g and the recessed portion 11h) and a distance between the second-end-side recessed portions 11c adjacent to each other in the width direction DW of the gravure roll 10 (a distance between the recessed portion 1 if and the recessed portion 11g and a distance between the recessed portion 11g and the recessed portion 11h) are made narrower than a distance between the intermediate recessed portions 11d adjacent to each other in the width direction DW of the gravure roll 10 (a distance between the recessed portions 11h). That is, the first-end-side recessed portions 11b and the second-end-side recessed portions 11c are placed with a higher density than the intermediate recessed portions 11d in terms of the width direction DW of the gravure roll 10. Hereby, the first-end-side recessed portions 11b and the second-end-side recessed portions 11c are placed with a higher density than the intermediate recessed portions 11d on the outer peripheral surface 15 of the gravure roll 10.

Hereby, in terms of the mixed powder 123 to be placed on the surface (the first surface 110b) of the current collector foil 110 by moving (flying) from the gravure roll 10 to the surface (the first surface 110b) of the current collector foil 110, the coating weights (mg/cm²) of the mixed powders 123 to be placed in parts on the opposite end sides (the first end side DX1 and the second end side DX2), in the width direction DX, of the surface (the first surface 110b) of the current collector foil 110 can be made larger than the coating weight (mg/cm²) of the mixed powder 123 to be placed in the intermediate part (a part between the part on the first end side DX1 and the part on the second end side DX2) in the width direction DX.

As a result, in a case where the mixed powders 123 placed in the parts on the opposite end sides in the width direction DX on the surface (the first surface 110b) of the current collector foil 110 expand toward the opposite end sides (the first end side DX1 or the second end side DX2), in the width direction DX, of the current collector foil 110 at the time when the electrode mixture layer (the negative-electrode mixture layer 120) is formed on the surface (the first surface 110b) of the current collector foil 110, the sag parts 120b can be hardly formed. The reason is as follows. That is, when the mixed powders 123 placed on the opposite end sides in the width direction DX expand outwardly in the width direction DX, an amount of the mixed powder 123 per unit area in the current collector foil 110 (that is, the coating weight of the mixed powder 123) decreases on the opposite end sides in the width direction DX. However, "the coating weights (mg/cm²) of the mixed powders 123 to be placed in the parts on the opposite end sides of the surface (the first surface 110b) of the current collector foil 110 in the width direction DX are made larger than the coating weight (mg/cm²) of the mixed powder to be placed in the intermediate part in the width direction DX," and therefore, the thicknesses of the mixed powders 123 placed on the opposite end sides in the width direction DX can hardly decrease in comparison with "a case where the coating weight of the mixed powder 123 is uniform in the width direction DX (the coating weights of the mixed powders 123 to be placed on the opposite end sides in the width direction DX are equal to the coating weight of the mixed powder 123 to be placed in the intermediate part in the width direction DX)." This makes it possible to decrease the width dimensions W of the sag parts 120b placed in the opposite ends of the electrode mixture layer (the negative-electrode mixture layer 120) in the width direction DX.

Note that the volume of the first-end-side recessed portions 11b per unit area in the first-end-side region 15b is a value (=C1/S1) obtained by dividing a sum (=C1) of volumes of all the first-end-side recessed portions 11b placed in the first-end-side region 15b by an area of the first-end-side region 15b when it is assumed that no recessed portion 11 is formed in the first-end-side region 15b (an area when it is assumed that the first-end-side region 15b has a flat cylindrical surface, the peripheral length of the first-end-side region 15b×the width dimension=S1). Further, the volume of the second-end-side recessed portions 11c per unit area in the second-end-side region 15c is a value (=C2/S2) obtained by dividing a sum (=C2) of volumes of all the second-end-side recessed portions 11c placed in the second-end-side region 15c by an area of the second-end-side region 15c when it is assumed that no recessed portion 11 is formed in the second-end-side region 15c (an area when it is assumed that the second-end-side region 15c has a flat cylindrical surface, the peripheral length of the second-end-side region 15c×the width dimension=S2). Further, the volume of the intermediate recessed portions 11d per unit area in the intermediate region 15d is a value (=C3/S3) obtained by dividing a sum (=C3) of volumes of all the intermediate recessed portions 11d placed in the intermediate region 15d by an area of the intermediate region 15d when it is assumed that no recessed portion 11 is formed in the intermediate region 15d (an area when it is assumed that the intermediate region 15d has a flat cylindrical surface, the peripheral length of the intermediate region 15d×the width dimension=S3).

Further, in the electrode sheet manufacturing apparatus 1 of the present embodiment, depths of all the recessed portions 11 formed in the gravure roll 10 are equal to each other at a depth D (see FIG. 3). More specifically, as illustrated in FIG. 3, in the gravure roll 10, the depth of the first-end-side recessed portion 11b, the depth of the second-end-side recessed portion 11c, and the depth of the intermediate recessed portion 11d are equal to each other at the depth D. Accordingly, in the electrode sheet manufacturing apparatus 1 of the present embodiment, in the gravure roll 10, while the volume of the first-end-side recessed portions 11b per unit area in the first-end-side region 15b and the volume of the second-end-side recessed portions 11c per unit area in the second-end-side region 15c are made larger than the volume of the intermediate recessed portions 11d per unit area in the intermediate region 15d, all the recessed portions 11 are set to the same depth (more specifically, the depth of the first-end-side recessed portion 11b, the depth of the second-end-side recessed portion 11c, and the depth of the intermediate recessed portion 11d are all set to the same depth).

As such, when all the recessed portions 11 are set to the same depth (more specifically, the depth of the first-end-side recessed portion 11b, the depth of the second-end-side recessed portion 11c, and the depth of the intermediate recessed portion 111d are set to the same depth), a distance between the surface (the first surface 110b) of the current collector foil 110 conveyed by the back-up roll 20 and the recessed portion 11 (the deepest position) can be made the same in terms of all the recessed portions 11 at a position where the outer peripheral surface 15 of the gravure roll 10 faces the outer peripheral surface 20b of the back-up roll 20 (a position where they become closest to each other). More specifically, at the position where the outer peripheral surface 15 of the gravure roll 10 faces the outer peripheral surface 20b of the back-up roll 20 (the position where they become closest to each other), a distance between the surface (the first surface 110b) of the current collector foil 110 conveyed by the back-up roll 20 and the first-end-side recessed portion 11b (the deepest position), a distance between the surface (the first surface 110b) of the current collector foil 110 conveyed by the back-up roll 20 and the second-end-side recessed portion 11c (the deepest position), and a distance between the surface (the first surface 110b) of the current collector foil 110 conveyed by the back-up roll 20 and the intermediate recessed portion 11d (the deepest position) can be set to the same distance.

Hereby, in terms of all the recessed portions 11, electrostatic forces working between the surface (the first surface 110b) of the current collector foil 110 conveyed by the back-up roll 20 and the mixed powders 123 filled in the recessed portions 11 can be made the same. More specifically, an electrostatic force working between the surface (the first surface 110b) of the current collector foil 110 conveyed by the back-up roll 20 and the mixed powder 123 filled in the first-end-side recessed portion 11b, an electrostatic force working between the surface (the first surface 110b) of the current collector foil 110 conveyed by the back-up roll 20 and the mixed powder 123 filled in the second-end-side recessed portion 11c, and an electrostatic force working between the surface (the first surface 110b) of the current collector foil 110 conveyed by the back-up roll 20 and the mixed powder 123 filled in the intermediate recessed portion 11d can be set to the same electrostatic force.

Accordingly, in terms of all the recessed portions 11, the mixed powders 123 filled in the recessed portions 11 can be moved (flown) to the surface (the first surface 110b) of the current collector foil 110 conveyed by the back-up roll 20 appropriately by the electrostatic force. More specifically, the mixed powder 123 filled in the first-end-side recessed portion 11b, the mixed powder 123 filled in the second-end-side recessed portion 11c, and the mixed powder 123 filled in the intermediate recessed portion 11d can be moved (flown) to the surface (the first surface 110b) of the current collector foil 110 conveyed by the back-up roll 20 appropriately by the electrostatic force.

In the meantime, as described above, in terms of the gravure roll 10, the volume of the first-end-side recessed portions 11b per unit area in the first-end-side region 15b and the volume of the second-end-side recessed portions 11c per unit area in the second-end-side region 15c are made larger than the volume of the intermediate recessed portions 11d per unit area in the intermediate region 15d. Accordingly, in terms of the mixed powder 123 to be placed on the surface (the first surface 110b) of the current collector foil 110 by moving (flying) from the gravure roll 10 to the surface (the first surface 110b) of the current collector foil 110, the coating weights ($mg/cm^2$) of the mixed powders 123 to be placed in the parts on the opposite end sides (the first end side DX1 and the second end side DX2) of the surface (the first surface 110b) of the current collector foil 110 in the width direction DX can be made larger than the coating weight ($mg/cm^2$) of the mixed powder 123 to be placed in the intermediate part (the part between the part on the first end side DX1 and the part on the second end side DX2) in the width direction DX.

Next will be described a manufacturing method for manufacturing the negative electrode sheet 100 according to the present embodiment. First, in a mixed powder placing step, the mixed powder 123 in which the powder of the negative-electrode active material 121 (the electrode active material) and the powder of the binder 122 are mixed with each other without a solvent is placed on the surface (the first surface 110b) of the current collector foil 110 by use of the electrode sheet manufacturing apparatus 1 (see FIG. 1) described above. More specifically, by use of the electrode sheet manufacturing apparatus 1 including the gravure roll 10 and the back-up roll 20 rotating in a facing manner and configured to convey the current collector foil 110 by the back-up roll 20 by passing the current collector foil 110 through the gap between the gravure roll 10 and the back-up roll 20, the mixed powder 123 in which the powder of the negative-electrode active material 121 (the electrode active material) and the powder of the binder 122 are mixed with each other without a solvent is placed on the surface (the first surface 110b) of the current collector foil 110 conveyed by the back-up roll 20.

More specifically, in the mixed powder placing step, in a state where a potential difference is caused between the gravure roll 10 and the current collector foil 110 conveyed by the back-up roll 20, the mixed powder 123 is continuously supplied into the recessed portions 11 on the outer peripheral surface 15 of the gravure roll 10 by the mixed powder supply device 30. Hereby, a potential difference is caused between the mixed powder 123 supplied into the recessed portions 11 of the gravure roll 10 and the current collector foil 110 conveyed by the back-up roll 20, so that an electrostatic force works between the mixed powder 123 and the current collector foil 110 by the potential difference.

Hereby, due to the electrostatic force working between the mixed powder 123 and the current collector foil 110 in the gap at the facing part where the gravure roll 10 and the back-up roll 20 face each other, the mixed powder 123 moves (flies) to the surface (the first surface 110b) of the current collector foil 110 from the outer peripheral surface 15 of the gravure roll 10, so that the mixed powder 123 is continuously placed on the surface (the first surface 110b) of the current collector foil 110 conveyed by the back-up roll 20.

Note that, in the present embodiment, in terms of the gravure roll 10, the volume of the first-end-side recessed portions 11b per unit area in the first-end-side region 15b and the volume of the second-end-side recessed portions 11c per unit area in the second-end-side region 15c are made larger than the volume of the intermediate recessed portions 11d per unit area in the intermediate region 15d (see FIGS. 2 and 3). Hereby, in terms of the mixed powder 123 to be placed on the surface (the first surface 110b) of the current collector foil 110 by moving (flying) from the gravure roll 10 to the surface (the first surface 110b) of the current collector foil 110, the coating weights (mg/cm$^2$) of the mixed powders 123 to be placed in the parts on the opposite end sides (the first end side DX1 and the second end side DX2) of the surface (the first surface 110b) of the current collector foil 110 in the width direction DX can be made larger than the coating weight (mg/cm$^2$) of the mixed powder 123 to be placed in the intermediate part (the part between the part on the first end side DX1 and the part on the second end side DX2) in the width direction DX.

Further, in the present embodiment, prior to the mixed powder placing step, the mixed powder 123 is manufactured, in a mixed powder manufacture step, such that the powder of the negative-electrode active material 121 and the powder of the binder 122 are mixed with each other at a weight ratio of 95:5. More specifically, as described above, the powder of the negative-electrode active material 121 and the powder of the binder 122 are mixed with each other by use of a high-speed mixer (made by EARTH TECHNICA CO., LTD.), so as to manufacture the mixed powder 123 made of composite particles (composite particles in a state where particles of the binder 122 are connected to a surface of a particle of the negative-electrode active material 121) obtained such that the particles of the negative-electrode active material 121 are combined with the particles of the binder 122.

Subsequently, in a mixed powder leveling step, the mixed powder 123 placed on the surface (the first surface 110b) of the current collector foil 110 is leveled on the first surface 110b of the current collector foil 110 so as to be formed into the mixed powder layer 127 having a generally uniform thickness. More specifically, when the current collector foil 110 on which the mixed powder 123 is placed is conveyed in the conveying direction DM and passes through the gap at the facing part where the nip roll 70 and the first heated roll 40 face each other, the mixed powder 123 is leveled on the first surface 110b of the current collector foil 110 and formed into the mixed powder layer 127 having a generally uniform thickness (see FIGS. 1 and 5).

After that, in a hot press step, the current collector foil 110 on which the mixed powder layer 127 made of the mixed powder 123 is placed is passed through between the heated rolls (the first heated roll 40 and the second heated roll 50) rotating in a facing manner, so that the binder 122 included in the mixed powder 123 is softened or melted, and the mixed powder 123 is pressed against the current collector foil 110.

More specifically, when the current collector foil 110 including the mixed powder layer 127 is conveyed in the conveying direction DM and passes through the gap at the facing part where the first heated roll 40 and the second heated roll 50 face each other, the mixed powder layer 127 is pressed against the current collector foil 110 in the thickness direction (the mixed powder layer 127 is pressurized toward the first surface 110b of the current collector foil 110, so that the mixed powder layer 127 is pressed against the first surface 110b of the current collector foil 110), and the binder 122 included in the mixed powder layer 127 is heated to soften or melt.

Hereby, the particles of the negative-electrode active material 121 included in the mixed powder layer 127 are joined to each other via the binder 122, and the negative-electrode mixture layer 120 made of the negative-electrode active material 121 and the binder 122 is bonded to the surface (the first surface 110b) of the current collector foil 110 via the binder 122. Hereby, the negative electrode sheet 100 (the electrode sheet) in which the negative-electrode mixture layer 120 (the electrode mixture layer) made of the negative-electrode active material 121 (the electrode active material) and the binder 122 is bonded to the surface (the first surface 110b) of the current collector foil 110 is manufactured without a solvent (see FIG. 6).

In the meantime, in the above mixed powder leveling step, when the current collector foil 110 on which the mixed powder 123 is placed passes through the gap at the facing part where the nip roll 70 and the first heated roll 40 face each other, and the mixed powder 123 is leveled on the first surface 110b of the current collector foil 110 and formed into the mixed powder layer 127, the mixed powders 123 placed in the opposite ends, in the width direction DX, of the mixed powder layer 127 move to expand outwardly (toward the opposite end sides) in the width direction DX on the first surface 110b of the current collector foil 110, so that the thickness of the mixed powder layer 127 decreases as it goes toward the ends of the mixed powder layer 127 in the width direction DX. That is, the opposite ends (the end on the first end side DX1 and the end on the second end side DX2) of the mixed powder layer 127 in the width direction DX become the sag parts 127b (see FIG. 8).

After that, in the hot press step, when the mixed powder layer 127 placed on the first surface 110b of the current collector foil 110 is heated and compressed by the heated rolls (the first heated roll 40 and the second heated roll 50) so as to be formed into the negative-electrode mixture layer 120, materials (the negative-electrode active material 121 and the binder 122) placed in the opposite ends of the negative-electrode mixture layer 120 (the mixed powder layer 127) in the width direction DX move to further expand toward the opposite end sides (the first end side DX1 and the second end side DX2) in the width direction DX on the first surface 110b of the current collector foil 110, so that the sag parts 120b are formed such that the thickness of the negative-electrode mixture layer 120 decreases as it goes toward the ends of the negative-electrode mixture layer 120 in the width direction DX (see FIG. 7).

In this regard, in the present embodiment, as described above, the gravure roll 10 is configured such that the volume of the first-end-side recessed portions 11b per unit area in the first-end-side region 15b and the volume of the second-end-side recessed portions 11c per unit area in the second-end-side region 15c are made larger than the volume of the intermediate recessed portions 11d per unit area in the intermediate region 15d (see FIGS. 2 and 3). Hereby, in the mixed powder placing step, the coating weights (mg/cm$^2$) of the mixed powders 123 to be placed in the parts on the opposite end sides (the first end side DX1 and the second end side DX2) of the surface (the first surface 110b) of the current collector foil 110 in the width direction DX are made larger than the coating weight (mg/cm$^2$) of the mixed powder 123 to be placed in the intermediate part (the part between the part on the first end side DX1 and the part on the second end side DX2) in the width direction DX.

With such a configuration, in the mixed powder leveling step and the hot press step, when the mixed powders 123 placed on the opposite end sides in the width direction DX expand outwardly in the width direction DX, the thicknesses of the mixed powders 123 placed on the opposite end sides in the width direction DX can hardly decrease in comparison with a "case where the coating weight of the mixed powder 123 is uniform in the width direction DX (the coating weights of the mixed powders 123 placed on the opposite end sides in the width direction DX are equal to the coating weight of the mixed powder 123 placed in the intermediate part in the width direction DX)." This makes it possible to decrease the width dimensions W of the sag parts 120*b* placed in the opposite ends of the electrode mixture layer (the negative-electrode mixture layer 120) in the width direction DX.

As described above, in the manufacturing method of the present embodiment, the negative-electrode mixture layer 120 (the electrode mixture layer) can be formed on the surface (the first surface 110*b*) of the current collector foil 110 as appropriate without using a solvent. This further makes it possible to decrease the width dimensions W of the sag parts 120*b* placed in the opposite ends of the electrode mixture layer (the negative-electrode mixture layer 120) in the width direction DX.

The negative electrode sheet 100 manufactured as such is then put together with a positive electrode sheet and a separator, and thus, an electrode body is formed. Subsequently, after terminal members are attached to the electrode body, the electrode body and an electrolytic solution are stored in a cell case. Hereby, a lithium-ion secondary battery is finished.

Evaluation Test

Figure 9:
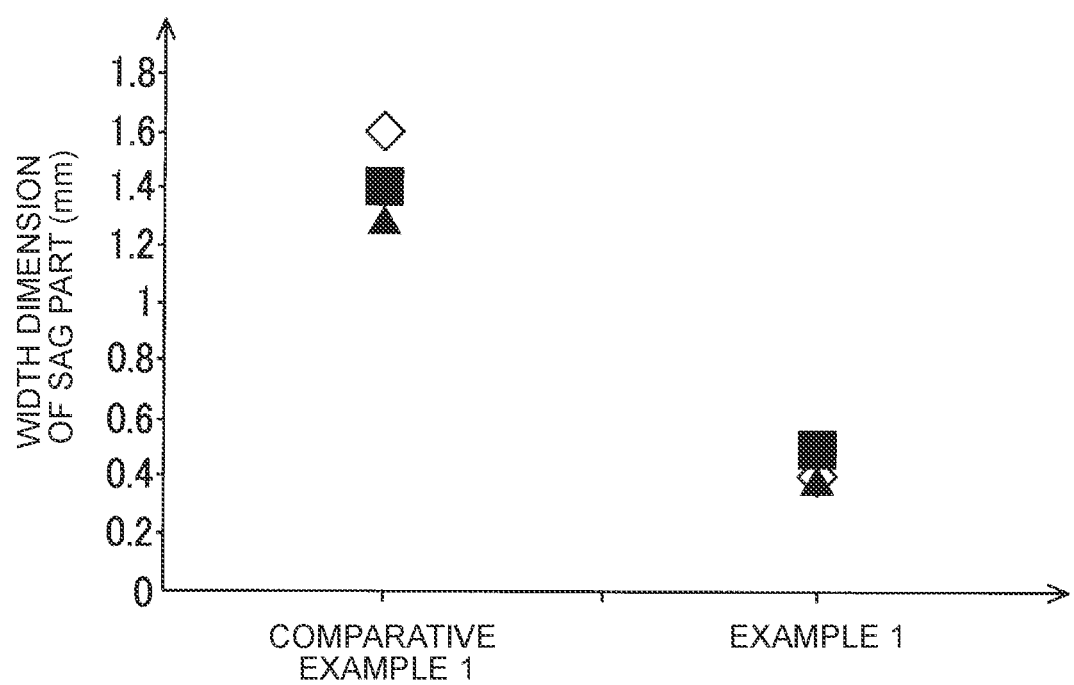
FIG. 9 is a view to compare width dimensions of sag parts of electrode sheets (negative electrode sheets)

Subsequently, a test for examining the width dimensions W of the sag parts 120*b* placed in the opposite ends of the electrode mixture layer (the negative-electrode mixture layer 120) in the width direction DX was performed on Example 1 and Comparative Example 1. More specifically, in Example 1, the negative electrode sheet 100 having a predetermined length was manufactured by use of the electrode sheet manufacturing apparatus 1 including the gravure roll 10 illustrated in FIGS. 2 and 3 as a gravure roll. Then, in terms of the negative electrode sheet 100 thus manufactured, an average value (mm) of the width dimensions W (see FIG. 7) of the sag parts 120*b* placed in the opposite ends of the negative-electrode mixture layer 120 in the width direction DX was measured. Note that, in Example 1, three negative electrode sheets 100 having the predetermined length were manufactured, and the average value of the width dimensions W of the sag parts 120*b* was measured for each of the negative electrode sheets 100. Results are shown in FIG. 9.

Note that, in Example 1, a dimple shape of the recessed portion 11*f* is constituted by a part of a spherical surface with a diameter of 1040 μm, a dimple shape of the recessed portion 11*g* is constituted by a part of a spherical surface with a diameter of 830 μm, and a dimple shape of the recessed portion 11*h* is constituted by a part of a spherical surface with a diameter of 700 μm. Further, in terms of the width direction DW, a distance between the recessed portion 11*f* and the recessed portion 11*g* is set to 145 μm, a distance between the recessed portion 11*g* and the recessed portion 11*h* is set to 230 μm, and a distance between the recessed portions 11*h* is set to 350 μm. Further, respective depths of the recessed portion 11*f*, the recessed portion 11*g*, and the recessed portion 11*h* are set to a depth D=300 μm.

In the meantime, in Comparative Example 1, the negative electrode sheet 100 having the predetermined length was manufactured by use of an electrode sheet manufacturing apparatus different from the electrode sheet manufacturing apparatus 1 used in Example 1 only in a form of recessed portions of a gravure roll. More specifically, differently from the gravure roll 10 of Example 1, Comparative Example 1 employs a gravure roll configured such that only recessed portions having a uniform volume are regularly arranged on an outer peripheral surface of the gravure roll (the recessed portions are arranged at regular intervals in the width direction DW). More specifically, in the gravure roll in Comparative Example 1, recessed portions (recessed portions similar to the recessed portions 11*h*) each having a dimple shape formed by a part of a spherical surface with a diameter of 700 m are arranged at intervals of 350 μm in the width direction DW. Note that, also in Comparative Example 1, the recessed portions are set to have a depth of 300 μm, similarly to Example 1.

In the gravure roll in Comparative Example 1, the volume of the first-end-side recessed portions per unit area in the first-end-side region, the volume of the second-end-side recessed portions per unit area in the second-end-side region, and the volume of the intermediate recessed portions per unit area in the intermediate region are equal to each other. On this account, in Comparative Example 1, respective coating weights of the mixed powders 123 are equal to each other in the width direction DX of the current collector foil 110. That is, the coating weights of the mixed powders 123 to be placed on the opposite end sides in the width direction DX are equal to the coating weight of the mixed powder 123 to be placed in the intermediate part in the width direction DX.

Also in Comparative Example 1, in terms of the negative electrode sheet 100 thus manufactured, an average value of the width dimensions W (mm) of the sag parts 120*b* placed in the opposite ends of the negative-electrode mixture layer 120 in the width direction DX was measured, similarly to Example 1. Note that, also in Comparative Example 1, three negative electrode sheets 100 having the predetermined length were manufactured, and the average value of the width dimensions W of the sag parts 120*b* was measured for each of the negative electrode sheets 100. Results are shown in FIG. 9.

As illustrated in FIG. 9, in Example 1, the width dimension W of the sag part 120*b* could be made small in comparison with Comparative Example 1. More specifically, in Example 1, the width dimension W of the sag part 120*b* could be reduced to about ⅓ of that in Comparative Example 1. From this result, it can be said that "when the gravure roll is configured such that the volume of the first-end-side recessed portions per unit area in the first-end-side region and the volume of the second-end-side recessed portions per unit area in the second-end-side region are made larger than the volume of the intermediate recessed portions per unit area in the intermediate region," the width dimensions W of the sag parts 120*b* placed in the opposite ends of the electrode mixture layer (the negative-electrode mixture layer 120) in the width direction DX can be made small.

Modification 1

Figure 10:
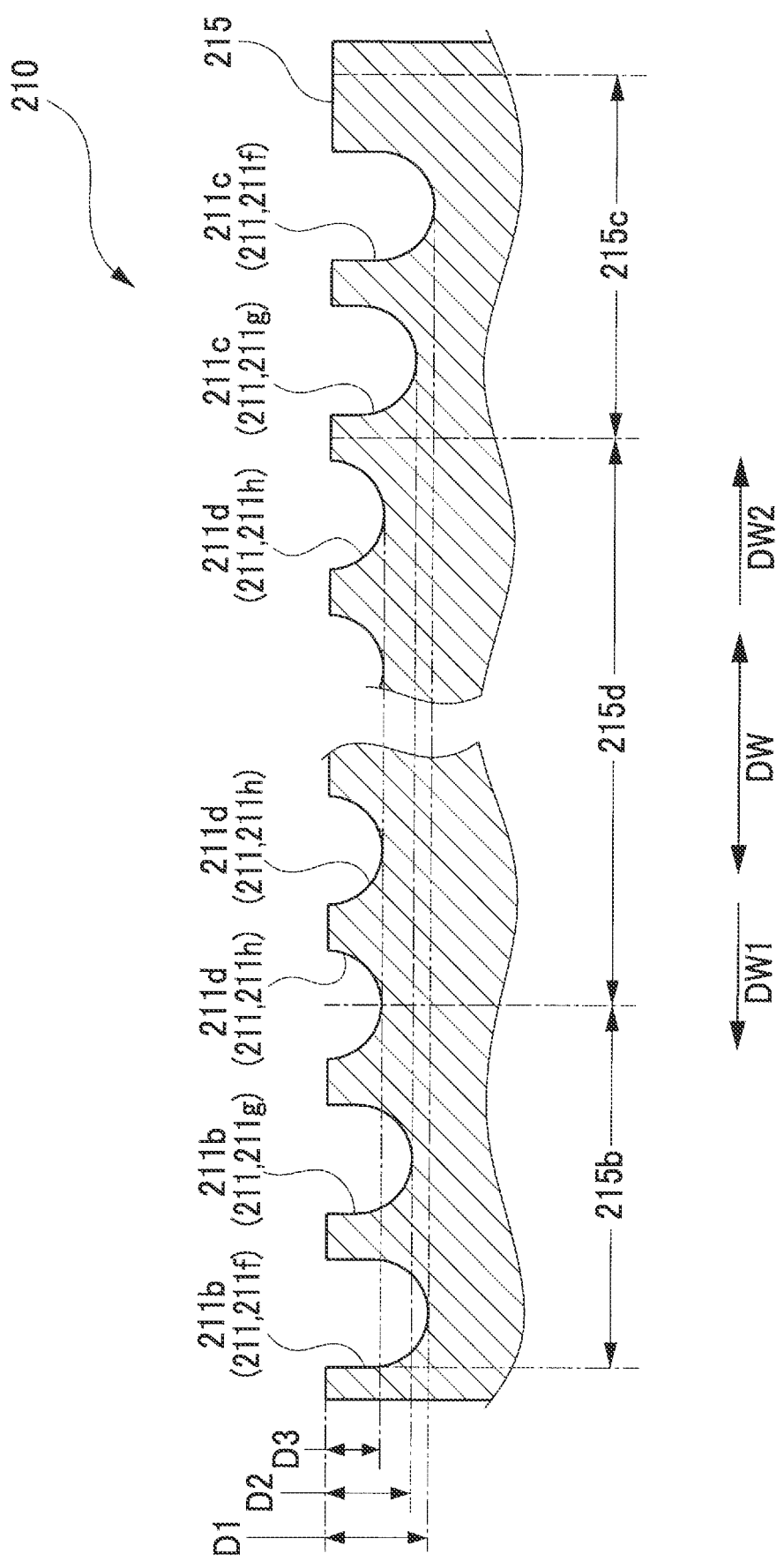
FIG. 10 is a sectional view of a gravure roll according to Modification 1.

Next will be described an electrode sheet manufacturing apparatus 201 of Modification 1. The electrode sheet manufacturing apparatus 201 of Modification 1 is different from the electrode sheet manufacturing apparatus 1 of the embodiment only in the gravure roll, and the other configuration in Modification 1 is the same as that in the embodiment (see FIG. 1). FIG. 10 is an enlarged sectional view of a gravure roll 210 in Modification 1 and is a sectional view obtained by radially cutting a gravure roll 210 at a position passing through the central axis of the gravure roll 210 (a view corresponding to FIG. 3). The gravure roll 210 in Modification 1 is different from the gravure roll 10 of the embodiment only in the form of the recessed portion. More specifically, as illustrated in FIG. 10, recessed portions 211 formed on an outer peripheral surface 215 of the gravure roll 210 have a dimple shape and their openings have the same diameter. Further, in the gravure roll 210, the recessed portions 211 are placed at regular intervals in the width direction DW.

Note that, in the gravure roll 210, a depth of first-end-side recessed portions 211b and a depth of second-end-side recessed portions 211c are made deeper than a depth of intermediate recessed portions 211d. More specifically, when D1 indicates depths of an endmost recessed portions 211f (included in the first-end-side recessed portions 211b) on the first end side DW1 in the width direction DW and an endmost recessed portion 211f (included in the second-end-side recessed portion 211c) placed on the second end side DW2 in the width direction DW, D2 indicates a depth of a recessed portion 211g (included in the first-end-side recessed portions 211b or the second-end-side recessed portions 211c) adjacent to the recessed portion 211f in the width direction DW, and D3 indicates a depth of a recessed portion 211h placed between the recessed portions 211g in the width direction DW, a relationship of D1>D2>D3 is satisfied (see FIG. 10).

Hereby, in the gravure roll 210, a volume of the first-end-side recessed portions 211b per unit area in a first-end-side region 215b and a volume of the second-end-side recessed portions 211c per unit area in a second-end-side region 215c are made larger than a volume of the intermediate recessed portions 211d per unit area in an intermediate region 215d. On this account, when the electrode sheet (the negative electrode sheet 100) is manufactured by use of the electrode sheet manufacturing apparatus 201 of Modification 1, the width dimensions W of the sag parts 120b placed in the opposite ends of the electrode mixture layer (the negative-electrode mixture layer 120) in the width direction DX can be made small.

Note that, in Modification 1, at the position where the outer peripheral surface 215 of the gravure roll 210 faces the outer peripheral surface 20b of the back-up roll 20 (the position where they become closest to each other), a distance between the surface (the first surface 110b) of the current collector foil 110 conveyed by the back-up roll 20 and the first-end-side recessed portion 211b (the deepest position) and a distance between the surface (the first surface 110b) of the current collector foil 110 conveyed by the back-up roll 20 and the second-end-side recessed portion 211c (the deepest position) are larger than a distance between the surface (the first surface 110b) of the current collector foil 110 conveyed by the back-up roll 20 and the intermediate recessed portion 211d (the deepest position).

On this account, in the mixed powder placing step, an electrostatic force working between the surface (the first surface 110b) of the current collector foil 110 conveyed by the back-up roll 20 and the mixed powder 123 placed on a bottom side of the first-end-side recessed portion 211b and an electrostatic force working between the surface (the first surface 110b) of the current collector foil 110 conveyed by the back-up roll 20 and the mixed powder 123 placed on a bottom side of the second-end-side recessed portion 211c are smaller than an electrostatic force working between the surface (the first surface 110b) of the current collector foil 110 conveyed by the back-up roll 20 and the mixed powder 123 filled in the intermediate recessed portion 211d. As a result, the mixed powder 123 placed on the bottom side of the first-end-side recessed portion 211b and the mixed powder 123 placed on the bottom side of the second-end-side recessed portion 211c are difficult to move (fly) to the surface (the first surface 110b) of the current collector foil 110. Accordingly, in the electrode sheet manufacturing apparatus 201 of Modification 1, in order to appropriately move (fly) the mixed powders 123 to the surface (the first surface 110b) of the current collector foil 110, it is necessary to generate a larger potential difference between the gravure roll 210 and the current collector foil 110 conveyed by the back-up roll 20 than the potential difference in the electrode sheet manufacturing apparatus 1 of the embodiment.

Modification 2

Figure 11:
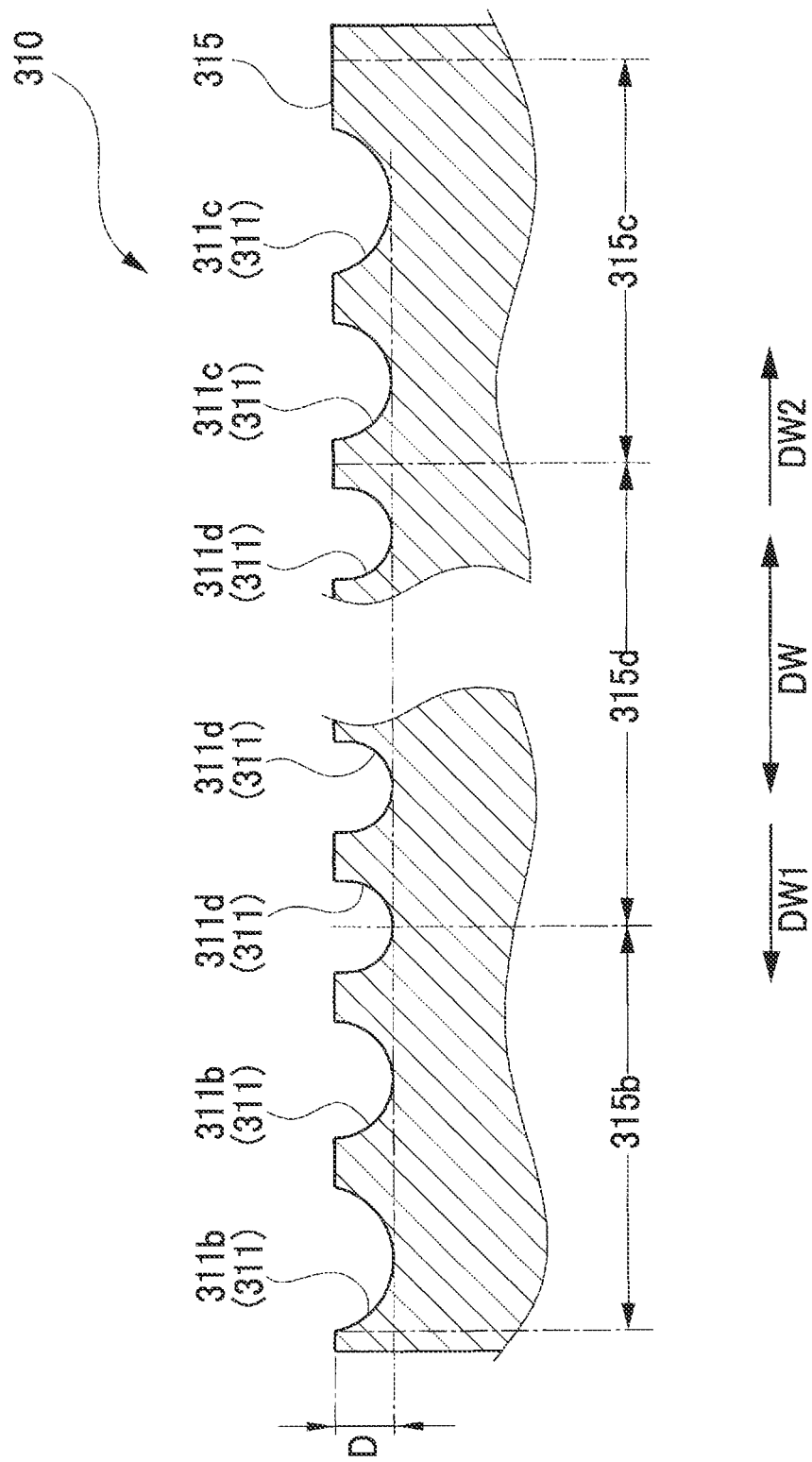
FIG. 11 is a sectional view of a gravure roll according to Modification 2.

Next will be described an electrode sheet manufacturing apparatus 301 of Modification 2. The electrode sheet manufacturing apparatus 301 of Modification 2 is different from the electrode sheet manufacturing apparatus 1 of the embodiment only in the gravure roll, and the other configuration in Modification 2 is the same as that in the embodiment (see FIG. 1). FIG. 11 is an enlarged sectional view of a gravure roll 310 in Modification 2 and is a sectional view obtained by radially cutting the gravure roll 310 at a position passing through the central axis of the gravure roll 310 (a view corresponding to FIG. 3). The gravure roll 310 in Modification 2 is different from the gravure roll 10 of the embodiment only in the form of the recessed portion.

More specifically, in the gravure roll 310 of Modification 2, recessed portions 311 formed on an outer peripheral surface 315 of the gravure roll 310 have a dimple shape, as illustrated in FIG. 11, and similarly to the gravure roll 10 of the embodiment, diameters of openings of first-end-side recessed portions 311b and second-end-side recessed portions 311c are made larger than a diameter of openings of intermediate recessed portions 311d. Further, all recessed portions 311 (the first-end-side recessed portion 311b, the second-end-side recessed portion 311c, and the intermediate recessed portion 311d) formed in the gravure roll 310 have the same depth D. Note that, differently from the gravure roll 10 of the embodiment, in the gravure roll 310 of Modification 2, the recessed portions 311 (the first-end-side recessed portions 311b, the second-end-side recessed portions 311c, and the intermediate recessed portions 311d) are arranged at regular intervals in the width direction DW.

Accordingly, also in the gravure roll 310 of Modification 2, a volume of the first-end-side recessed portions 311b per unit area in a first-end-side region 315b and a volume of the second-end-side recessed portions 311c per unit area in a second-end-side region 315c are made larger than a volume of the intermediate recessed portions 311d per unit area in an intermediate region 315d. On this account, when the electrode sheet (the negative electrode sheet 100) is manufactured by use of the electrode sheet manufacturing apparatus 301 of Modification 2, the width dimensions W of the sag parts 120b placed in the opposite ends of the electrode mixture layer (the negative-electrode mixture layer 120) in the width direction DX can be made small.

Modification 3

Next will be described an electrode sheet manufacturing apparatus 401 of Modification 3. The electrode sheet manufacturing apparatus 401 of Modification 3 is different from the electrode sheet manufacturing apparatus 1 of the embodiment only in the gravure roll, and the other configuration in Modification 3 is the same as that in the embodiment (see FIG. 1). FIG. 12 is an enlarged sectional view of a gravure roll 410 in Modification 3 and is a sectional view obtained by radially cutting the gravure roll 410 at a position passing through the central axis of the gravure roll 410 (a view corresponding to FIG. 3). The gravure roll 410 in Modification 3 is different from the gravure roll 10 of the embodiment only in the form of the recessed portion.

More specifically, as illustrated in FIG. 12, recessed portions 411 formed on an outer peripheral surface 415 of the gravure roll 410 have a dimple shape, but they are formed in the same shape (the same dimension), differently from the embodiment. However, in the gravure roll 410 of Modification 3, a distance between first-end-side recessed portions 411$b$ adjacent to each other in the width direction DW of the gravure roll 410 and a distance between second-end-side recessed portions 411$c$ adjacent to each other in the width direction DW of the gravure roll 410 are made smaller than a distance between intermediate recessed portions 411$d$ adjacent to each other in the width direction DW of the gravure roll 410. Hereby, the number of first-end-side recessed portions 411$b$ per unit area in a first-end-side region 415$b$ and the number of second-end-side recessed portions 411$c$ per unit area in a second-end-side region 415$c$ are made larger than the number of intermediate recessed portions 411$d$ per unit area in an intermediate region 415$d$.

Accordingly, also in the gravure roll 410 of Modification 3, a volume of the first-end-side recessed portions 411$b$ per unit area in the first-end-side region 415$b$ and a volume of the second-end-side recessed portions 411$c$ per unit area in the second-end-side region 415$c$ are made larger than a volume of the intermediate recessed portions 411$d$ per unit area in the intermediate region 415$d$. On this account, when the electrode sheet (the negative electrode sheet 100) is manufactured by use of the electrode sheet manufacturing apparatus 401 of Modification 3, the width dimensions W of the sag parts 120$b$ placed in the opposite ends of the electrode mixture layer (the negative-electrode mixture layer 120) in the width direction DX can be made small.

Thus, the disclosure has been described above in line with the embodiment and Modifications 1 to 3. However, needless to say, the disclosure is not limited to the above embodiment and so on and can be modified and applied appropriately without departing from the gist of the disclosure.

For example, the embodiment and so on deal with an example in which the electrode sheet manufacturing apparatuses 1, 201, 301, 401 are used to manufacture the negative electrode sheet 100. However, the electrode sheet manufacturing apparatuses 1, 201, 301, 401 may be used to manufacture a positive electrode sheet. That is, the electrode sheet manufacturing apparatus of the disclosure is also applicable to an apparatus for manufacturing a positive electrode sheet as well as an apparatus for manufacturing a negative electrode sheet.

Further, in the embodiment and so on, the form (pattern) of the recessed portions of the gravure roll is such that the recessed portions 11, 211, 311, 411 having a dimple shape are placed on the outer peripheral surfaces 15, 215, 315, 415 of the gravure rolls 10, 210, 310, 410. However, the form (pattern) of the recessed portions of the gravure roll may be any form (pattern). For example, linear recessed portions may be formed on the outer peripheral surface of the gravure roll.

Further, the embodiment and so on deal with an example in which the negative-electrode mixture layer 120 is formed only on one surface (the first surface 110$b$) of the current collector foil 110 by use of the electrode sheet manufacturing apparatuses 1, 201, 301, 401. However, the negative-electrode mixture layer 120 may be formed on both surfaces (the first surface 110$b$ and a second surface 110$c$) of the current collector foil 110. In a case where the negative-electrode mixture layer 120 is formed on both surfaces (the first surface 110$b$ and a second surface 110$c$) of the current collector foil 110, the negative-electrode mixture layer 120 is formed on one surface (the first surface 110$b$) of the current collector foil 110 by use of the electrode sheet manufacturing apparatuses 1, 201, 301, 401 as described above, and then, similar steps (the mixed powder placing step, the mixed powder leveling step, and the hot press step) should be performed on the second surface 110$c$, of the current collector foil 110, on which the negative-electrode mixture layer 120 is not formed.

What is claimed is:

1. An electrode sheet manufacturing apparatus for manufacturing an electrode sheet in which an electrode mixture layer including an electrode active material and a binder is formed on a surface of a current collector foil, the electrode sheet manufacturing apparatus comprising:
    a gravure roll with an outer peripheral surface having an irregular shape, the gravure roll being configured to rotate; and
    a back-up roll configured to rotate in a state where the back-up roll faces the gravure roll with a gap being formed between the back-up roll and the gravure roll, the back-up roll being configured to convey the current collector foil by passing the current collector foil through the gap, wherein:
    in a state where a potential difference is caused between the gravure roll and the current collector foil conveyed by the back-up roll, a mixed powder obtained by mixing powder of the electrode active material with powder of the binder without a solvent is continuously supplied into recessed portions on the outer peripheral surface of the gravure roll such that a potential difference is caused between the mixed powder supplied into the recessed portions of the gravure roll and the current collector foil;
    the mixed powder is moved from the gravure roll to the surface of the current collector foil by an electrostatic force working between the mixed powder and the current collector foil such that the mixed powder is continuously placed on the surface of the current collector foil conveyed by the back-up roll;
    a region where the recessed portions are provided in a width direction of the gravure roll on the outer peripheral surfaces of the gravure roll includes
        a first-end-side region placed on a first end side in the width direction of the gravure roll,
        a second-end-side region placed on a second end side in the width direction of the gravure roll, and
        an intermediate region placed between the first-end-side region and the second-end-side region;
    the recessed portions formed in the gravure roll include
        first-end-side recessed portions placed in the first-end-side region,
        second-end-side recessed portions placed in the second-end-side region, and
        intermediate recessed portions placed in the intermediate region; and
    a volume of the first-end-side recessed portions per unit area in the first-end-side region and a volume of the second-end-side recessed portions per unit area in the second-end-side region are made larger than a volume of the intermediate recessed portions per unit area in the intermediate region.

2. The electrode sheet manufacturing apparatus according to claim 1 including a pair of heated rolls provided such that the heated rolls face each other via a gap and rotate, wherein the electrode mixture layer including the electrode active material and the binder is bonded to the surface of the current collector foil by passing the current collector foil on which the mixed powder is placed through the gap between the heated rolls such that the mixed powder is pressed against the current collector foil while the binder included in the mixed powder is softened or melted.

3. The electrode sheet manufacturing apparatus according to claim 2 including a nip roll placed on a downstream side from the back-up roll but on an upstream side from the heated rolls in a conveying direction of the current collector foil, the nip roll being configured to level the mixed powder placed on the surface of the current collector foil.

4. The electrode sheet manufacturing apparatus according to claim 1, wherein the recessed portions in the gravure roll have the same depth.

* * * * *